United States Patent
Ueki et al.

(10) Patent No.: US 9,447,300 B2
(45) Date of Patent: Sep. 20, 2016

(54) INK, INK SET, AND RECORDING DEVICE

(71) Applicant: FUJI XEROX CO., LTD., Tokyo (JP)

(72) Inventors: Hiroyuki Ueki, Ebina (JP); Mami Hatanaka, Ebina (JP); Hirohito Yoneyama, Ebina (JP); Reika Abe, Ebina (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/459,889

(22) Filed: Aug. 14, 2014

(65) Prior Publication Data

US 2015/0267067 A1    Sep. 24, 2015

(30) Foreign Application Priority Data

Mar. 24, 2014  (JP) ................. 2014-060569
Mar. 24, 2014  (JP) ................. 2014-060570
Mar. 24, 2014  (JP) ................. 2014-060571
Mar. 24, 2014  (JP) ................. 2014-060886

(51) Int. Cl.
C09D 11/40  (2014.01)
C09D 11/322 (2014.01)
C09D 11/10  (2014.01)

(52) U.S. Cl.
CPC .............. *C09D 11/40* (2013.01); *C09D 11/10* (2013.01); *C09D 11/322* (2013.01)

(58) Field of Classification Search
None
See application file for complete search history.

(56) References Cited

U.S. PATENT DOCUMENTS

| 7,037,362 B2 * | 5/2006 | Honma | C09D 11/30 106/31.13 |
| 2004/0069183 A1 * | 4/2004 | Kamoto | C09D 11/40 106/31.27 |
| 2007/0120928 A1 * | 5/2007 | Ma | C09D 11/38 347/100 |
| 2008/0012887 A1 | 1/2008 | Maeno et al. | |
| 2008/0018722 A1 * | 1/2008 | Mafune | C09D 11/322 347/100 |
| 2013/0149505 A1 * | 6/2013 | Yano | C09D 7/1241 428/195.1 |
| 2013/0155144 A1 * | 6/2013 | Kunimine | B41J 2/07 347/20 |
| 2013/0258011 A1 * | 10/2013 | Boris | C09D 11/38 347/100 |
| 2013/0258012 A1 * | 10/2013 | Boris | C09D 11/38 347/100 |
| 2013/0307912 A1 | 11/2013 | Masuda et al. | |
| 2014/0364548 A1 * | 12/2014 | Everhardus | C09D 11/322 524/166 |

FOREIGN PATENT DOCUMENTS

| JP | A-2001-262097 | 9/2001 |
| JP | A-2001-288390 | 10/2001 |
| JP | A-2003-213179 | 7/2003 |
| JP | A-2006-219625 | 8/2006 |
| JP | A-2007-261203 | 10/2007 |
| JP | A-2011-219646 | 11/2011 |
| JP | A-2013-112801 | 6/2013 |
| JP | A-2013-256108 | 12/2013 |

* cited by examiner

*Primary Examiner* — An Do
*Assistant Examiner* — Renee I Wilson
(74) *Attorney, Agent, or Firm* — Oliff PLC

(57) ABSTRACT

There is provided an ink comprising a colorant, a polymer particle, water, and a water-soluble organic solvent, wherein the ink has a static surface tension of 30 mN/m or less and, when examined for dynamic surface tension by the maximum bubble pressure method, has a width of variations in dynamic surface tension, for a period from 1 msec after to 1 sec after, of 0.2 mN/m to 3.0 mN/m.

13 Claims, 3 Drawing Sheets

INK, INK SET, AND RECORDING DEVICE

CROSS-REFERENCE TO RELATED APPLICATIONS

This application is based on and claims priority under 35 USC 119 from Japanese Patent Application No. 2014-60569 filed on Mar. 24, 2014 and Japanese Patent Application No. 2014-60570 filed on Mar. 24, 2014, and Japanese Patent Application No. 2014-60571 filed on Mar. 24, 2014, and Japanese Patent Application No. 2014-60886 filed on Mar. 24, 2014.

BACKGROUND

1. Field

The present invention relates to an ink, an ink set and a recording device.

2. Description of the Related Art

JP-A-2011-219646 discloses "an ink-jet recording liquid which contains a resin for pigment dispersion that is water-soluble, wherein the mass ratio of the resin for pigment dispersion to the pigment (resin content/pigment content) is 0.3-0.6 and the mass ratio of the free resin of the resin for pigment dispersion, the free resin being not adherent to the pigment, to the pigment (free-resin amount/pigment content) is 0-0.1, the recording liquid having a dynamic surface tension, as measured at the time when the surface life is 10 ms, of 46 mN/m or higher".

JP-A-2006-219625 discloses "a nonaqueous ink for ink-jet recording which has the property of curing upon irradiation with light, e.g., ultraviolet light or electron beams, and has a value of dynamic surface tension as measured at 80 milliseconds of higher than 28 mN/m and in which the value obtained by subtracting the value of dynamic surface tension measured at 1,000 milliseconds from the value of dynamic surface tension measured at 80 milliseconds is less than 8 mN/m".

JP-A-2013-112801 discloses "an ink-jet ink which has a dynamic surface tension γ30, as measured at 30 seconds after by the plate method, in the range of 25-35 mN/m and in which the difference between γ30 and the dynamic surface tension γ600 measured at 600 seconds after satisfies γ600−γ30≤−1 mN/m".

JP-A-2007-261203 discloses "a method for image formation characterized in that a first liquid which contains no colorant and has a value of dynamic surface tension, as measured at a temperature of 25° C. and at a surface life of 0.1 sec, of $\gamma_1(0.1\ sec)$ is applied to a surface of a recording medium and thereafter a second liquid which contains a colorant and has a value of dynamic surface tension, as measured at a temperature of 25° C. and at a surface life of 0.1 sec, of $\gamma_2(0.1\ sec)$ which is larger than the $\gamma_1(0.1\ sec)$ is applied by dropping to the area where the first liquid is present as a liquid film".

JP-A-2001-288390 discloses "an ink set for ink-jet recording which includes a black ink (a) having a surface tension (γa) of 40 mN/m or less and a drying time of 5 seconds or less and a black ink (b) having a surface tension (γb) of 35 mN/m or higher and a drying time of 15 seconds or longer, and in which [surface tension (γa)]<[surface tension (γb)] and the colorant in the black ink (a) and the colorant in the black ink (b) are both a pigment".

JP-A-2013-256108 discloses an ink for recording images on media for concealing postal cards, the ink including water, a water-soluble organic solvent, a colorant, and a surfactant and satisfying the following requirements (1) to (4).

(1) To have a dynamic surface tension ($D_1$) for the surface life period from 15 ms to less than 100 ms, as determined by the maximum bubble pressure method, of 30.0-60.0 mN/m (2) To have a dynamic surface tension ($D_2$) for the surface life period from 100 to 3,000 ms, as determined by the maximum bubble pressure method, of 27.0-35.0 mN/m (3) $D_1 \geq D_2$ (4) To have a static surface tension of 27.0 mN/m or less JP-A-2001-262097 discloses, as a technique for reducing ink offset, "a pressure-sensitive adhesive composition that is excellent in terms of the fixability of ink-jet inks and is to be applied to the mating surfaces of a sheet and dried to form adhesive layers which in the ordinary state do not adhere and which are used in such a manner that the mating surfaces are disposed so as to face and be in contact with each other and a given pressure is applied thereto to thereby strippably bond the mating surfaces to each other, the pressure-sensitive adhesive composition being characterized by being obtained by compounding 100 parts by mass of a natural-rubber-based adhesive base with 10-50 parts by mass of a silica gel having an average particle diameter of 1-5 μm and an oil absorption of 100 mL/100 g or higher and with 10-50 parts by mass of a cationic substance".

JP-A-2003-213179 discloses "an ink for ink jet recording which comprises water, a colorant, and a water-soluble organic solvent as essential components, wherein the content of the colorant is 6 wt % or higher, the ink for ink-jet recording having a coefficient of absorption in plane paper of 3 mL/(m²·(msec)$^{1/2}$) and a contact angle $\theta_0$ with plane paper of 10° or larger but less than 40°".

SUMMARY (1) An ink containing a colorant, a polymer particle, water, and a water-soluble organic solvent, wherein the ink has a static surface tension of 30 mN/m or less and, when examined for dynamic surface tension by the maximum bubble pressure method, has a width of variations in dynamic surface tension, for a period from 1 msec after to 1 sec after, of 0.2 mN/m to 3.0 mN/m.

BRIEF DESCRIPTION OF THE DRAWINGS

FIG. 3 is schematic views for explaining a mechanism by which ink droplet delivery interference occurs

FIG. 4 is schematic views that show states in which ink droplets are delivered from an ink set according to the exemplary embodiment.

Figure 1:
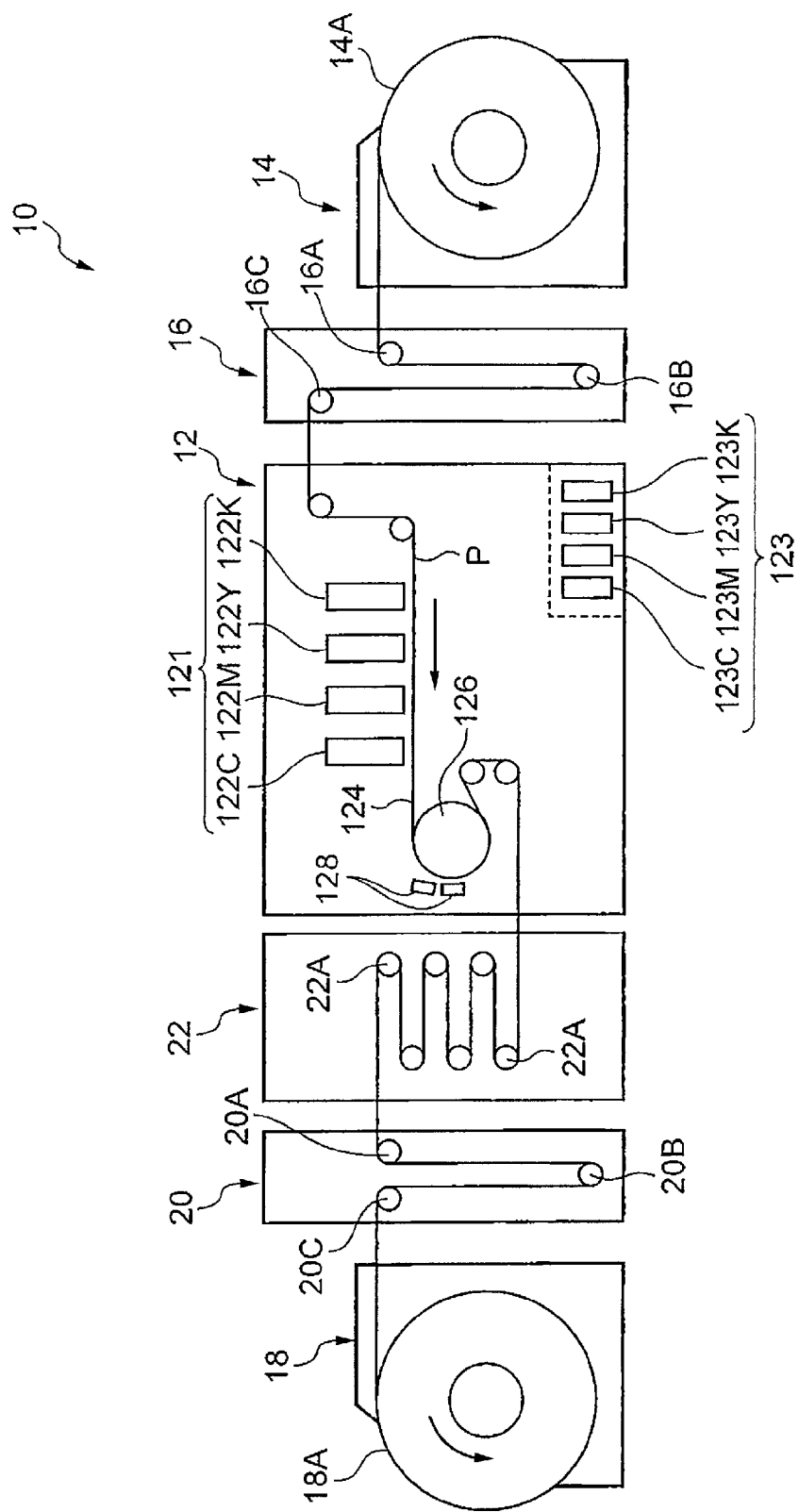
FIG. 1 is a diagrammatic view which illustrates the configuration of a recording device according to the exemplary embodiment.

In the Figs, 10 denotes Recording device, 12 denotes Image-recording unit, 14 denotes Pretreatment unit, 14A denotes Feed roll, 16 denotes Buffer unit, 16A denotes First path roller, 16B denotes Dancer roller, 16C denotes Second path roller, 18 denotes Post-treatment unit, 18A denotes Wind-up roll, 20 denotes Buffer unit, 20A denotes First path roller, 20B denotes Dancer roller, 20C denotes Second path roller, 22 denotes Cooling unit, 22A denotes Cooling roller, 121 denotes Ejection device, 122, 122K, 122Y, 122M, 122C denote Ejection head, 123, 123K, 123Y, 123M, 123C denote Ink cartridge, 124 denotes Conveying passage, 126 denotes Drying drum, 128 denotes Hot-air blower, P denotes Recording medium, and P' denotes Continuous paper configured of base and pressure-sensitive adhesive layer formed thereon (press-bonding paper for ink-jet recording)

DETAILED DESCRIPTION

An exemplary embodiment which is one example according to the invention will be described below in detail.

An exemplary embodiment of the invention firstly refers to an ink which comprises a colorant, a polymer particle, water, and a water-soluble organic solvent and has a static surface tension of 30 mN/m or less and which, when examined for dynamic surface tension by the maximum bubble pressure method, has a width of variations in dynamic surface tension, for a period from 1 msec after to 1 sec after, of 0.2-3.0 mN/m.

(Ink/Ink Set)

The ink (hereinafter also referred to as "water-based ink") of the first exemplary embodiment of the invention includes a colorant, a polymer particle, water, and a water-soluble organic solvent. This water-based ink has a static surface tension less than 30 mN/m and, when examined for dynamic surface tension by the maximum bubble pressure method, has a dynamic surface tension as measured at 1 msec after of 32 mN/m or less and a dynamic surface tension as measured at 1 sec after of less than 30 mN/m, the width of variations in dynamic surface tension for the period from 1 msec after to 1 sec after being 0.2-3.0 mN/m. Hereinafter, the water-based ink having such surface tension properties is often referred to as "ink (1)".

Meanwhile, the ink set of the first exemplary embodiment of the invention includes ink (1) and a water-based ink which includes a colorant, water, and a water-soluble organic solvent and has a static surface tension of 30 mN/m or higher and which, when examined for dynamic surface tension by the maximum bubble pressure method, has a dynamic surface tension as measured at 1 msec after of 38 mN/m or higher and a dynamic surface tension as measured at 1 sec after of 30 mN/m or higher, the width of variations in dynamic surface tension for the period from 1 msec after to 1 sec after being 1.5-9.0 mN/m, the water-based ink having a color different from the color of ink (1). Hereinafter, this water-based ink having such surface tension properties and differing in color from ink (1) is often referred to as "ink (2)".

Ink (1), in which the dynamic surface tension, the dynamic surface tensions as measured at 1 msec after and at 1 sec after, and the width of variations in dynamic surface tension are within the ranges shown above, is an ink which has a reduced static surface tension and reduced values of the dynamic surface tensions and further has a reduced width of variations in dynamic surface tension. Namely, the feature indicates that this ink has the property of being apt to spread on and wet recording media.

Meanwhile, ink (2), in which the dynamic surface tension, the dynamic surface tensions as measured at 1 msec after and at 1 sec after, and the width of variations in dynamic surface tension are within the ranges shown above, is an ink which has an increased static surface tension and increased values of the dynamic surface tensions and further has an increased width of variations in dynamic surface tension. Namely, the feature indicates that this ink has the property of being less apt to spread on and wet recording media. Incidentally, ink (2) corresponds to conventional infiltrating inks for application to permeable recording media.

When ink (1), which has the property of being apt to spread on and wet recording media and contains a polymer particle, is ejected onto a permeable recording medium, this ink quickly spreads on and wets the recording medium and the infiltration of the liquid components contained in this ink (1) into the recording medium is accelerated. In this stage, the polymer particle, which is a solid component of this ink (1), is slow in infiltrating into the recording medium (i.e., into interstices among the paper fibers), resulting in enhanced interaction between the polymer particles.

This enhancement in interaction between the polymer particles results in an increase in apparent viscosity in the vicinity of the polymer particles. As a result, the polymer particle is apt to remain on the surface of the recording medium and is less apt to spread in the directions of the plane of the recording medium (i.e., the directions parallel with the plane). Accordingly, the colorant, which also is a solid component of the ink (1), becomes apt to be involved in the interaction between the polymer particles and remain on the surface of the recording medium and becomes less apt to spread in the directions of the plane of the recording medium (i.e., the directions parallel with the plane). In particular, since ink (1) has the surface tension properties described above, this ink is apt to be deprived of the stability when some of the liquid components of the ink are absorbed in the recording medium. Separation between the liquid components and the solid components (the colorant and the polymer particle) in the ink is hence accelerated, and those phenomena are apt to occur.

Consequently, ink (1) by itself is capable of being inhibited from causing image blurring.

In cases when ink (2), which is less apt to spread on and wet recording media, is ejected onto a permeable recording medium together with ink (1), then the ink (2) on the recording medium is in the state of not spreading on and wetting the recording medium and the liquid components of the ink (2) infiltrate into the recording medium. Because of this, both the image formed from ink (1) and the image formed from ink (2) are less apt to blur, and even in cases when these images are formed so as to adjoin or overlap each other, blurring is inhibited.

Known conventional methods for inhibiting blurring include: 1) a method in which an ink which infiltrates quickly and has a light color (e.g., yellow) is applied first to record an image thereof and an ink which infiltrates slowly and has a dark color (e.g., black) is thereafter applied to record an image thereof; and 2) a method in which inks of multiple colors which all infiltrate quickly are used, and the ink of a dark color (e.g., black) is applied first to record an image thereof and the inks of light colors (e.g., yellow) are subsequently applied to record images thereof (in particular, a method in which a black-ink image is recorded first and a yellow-ink image is recorded last).

However, since ink (1) by itself is capable of being inhibited from causing image blurring, inhibition of image blurring is attained without being affected by the sequence of recording with inks of multiple colors. Furthermore, in cases when ink (1) is applied as an ink of a dark color (in particular, black), which is prone to cause conspicuous blurring, the image blurring due to inks of dark colors (in particular, black) is reduced. Especially in the case where images are recorded using inks in the recording order 2) shown above, blurring is inhibited.

As described above, the water-based ink of the first exemplary embodiment of the invention is effective in inhibiting image blurring. Furthermore, the ink set of the first exemplary embodiment of the invention is effective in inhibiting image blurring (in particular, blurring between colors).

Moreover, the water-based ink of the first exemplary embodiment of the invention (ink (1)) has the property of leaving the colorant on the surface of a permeable recording medium as stated above. Consequently, this water-based ink (ink (1)) is further inhibited from causing the phenomenon in which the image formed therefrom on a surface of a permeable recording medium is perceived from the side opposite from the image-recording surface of the recording medium (hereinafter, this phenomenon is referred to also as "strike-through").

This strike-through is apt to occur especially in the case where images are formed from inks of dark colors (in particular, black) on thin paper as a recording medium. In such cases, by applying the water-based ink of the first exemplary embodiment of the invention (ink (1)) as a black ink, the strike-through is inhibited.

The water-based ink of the first exemplary embodiment of the invention (ink (1)) is an ink having the property of quickly spreading on and wetting recording media, as stated above. Since this water-based ink (ink (1)) quickly spreads on and wets impermeable recording media, quick drying is rendered possible even in the case of a recording medium into which the ink does not infiltrate or is less apt to infiltrate. Because of this, even if the surface on which an image has been recorded using the water-based ink (ink (1)) comes into contact with a roller member just after the image recording, the image is inhibited from peeling off As described above, the water-based ink and ink set of the first exemplary embodiment of the invention are effective in inhibiting image blurring even when applied to permeable recording media, in which image blurring is prone to occur, and are effective in inhibiting image peeling even when applied to impermeable recording media, in which image peeling is prone to occur. Consequently, the water-based ink and ink set of the first exemplary embodiment of the invention are applicable to a wide variety of recording media.

It is, however, noted that those reasons for the inhibition of image blurring and image peeling are a presumption and should not be restrictively construed at all.

Examples of the permeable recording media include plain paper. Specifically, the term "permeable recording medium" means a recording medium in which, in an examination with a dynamic scanning liquid absorption meter, the maximum ink absorption in a contact time of 500 ms exceeds 15 mL/m$^2$.

Meanwhile, examples of the impermeable recording media include coated paper and resin films. Specifically, the term "impermeable recording medium" means a recording medium in which, in an examination with a dynamic scanning liquid absorption meter, the maximum ink absorption in a contact time of 500 ms is 15 mL/m$^2$ or less.

In the water-based ink and ink set of the first exemplary embodiment of the invention, the static surface tension of ink (1) is less than 30 mN/m, and is preferably 22-28 mN/m from the standpoint of ejection stability.

The values of static surface tension were measured in an atmosphere of 23° C. and 55% RH using Wilhelmy surface tension balance CBVP-Z (manufactured by Kyowa Interface Science Co., Ltd.).

The dynamic surface tension of ink (1) as measured at 1 msec after is 32 mN/m or less, and is preferably 20-30 mN/m, more preferably 22-28 mN/m, from the standpoint of inhibiting image blurring and image peeling.

Meanwhile, the dynamic surface tension of ink (1) as measured at 1 sec after is less than 30 mN/m, and is preferably 20-28 mN/m, more preferably 22-28 mN/m, from the standpoint of inhibiting image blurring and image peeling.

The width of variations in dynamic surface tension of ink (1) is 0.2-3.0 mN/m, and is preferably 0.2-2.8 mN/m, more preferably 0.2-2.0 mN/m, from the standpoint of inhibiting image blurring and image peeling. Incidentally, the width of variations in dynamic surface tension is the difference between the value of dynamic surface tension measured at 1 msec after and the value of dynamic surface tension measured at 1 sec after.

The values of dynamic surface tension were measured in an atmosphere of 23° C. and 55% RH using dynamic surface tensiometer MPT C (manufactured by Lauda GmbH), which is based on the maximum bubble pressure method.

Incidentally, the value of dynamic surface tension as measured at 1 msec after is the value of dynamic surface tension measured at the time when 1 msec has passed since a new interface was formed at the end of the capillary and when a maximum bubble pressure is reached. It is, however, noted that in dynamic surface tensiometers based on the maximum bubble pressure method in which a displayed limit of measurement is a dynamic surface tension measured at 1 msec after, there are cases where this value is expressed as dynamic surface tension measured at 0 msec after. In this case, the value of dynamic surface tension measured at 0 msec after is taken as a value of dynamic surface tension measured at 1 msec after.

Meanwhile, the value of dynamic surface tension as measured at 1 sec after is the value of dynamic surface tension measured at the time when 1 sec has passed since a new interface was formed at the end of the capillary and when a maximum bubble pressure is reached. It is, however, noted that in dynamic surface tensiometers based on the maximum bubble pressure method in which a limit of measurement is a dynamic surface tension measured at less than 1 sec after, the value of dynamic surface tension measured at the limit of measurement is taken as a value of dynamic surface tension measured at 1 sec after. This is because so long as the value of dynamic surface tension is one measured at the limit of measurement, it is possible to determine that the dynamic surface tension was in a stable region.

From the standpoint of regulating ink (1) so that the static surface tension, the dynamic surface tension as measured at 1 msec after or at 1 sec after, and the width of variations in dynamic surface tension are within the ranges shown above, it is desirable, for example, that ink (1) should contain a surfactant in addition to a colorant, a polymer particle, water, and a water-soluble organic solvent. Namely, it is desirable that the static surface tension, the dynamic surface tension as measured at 1 msec after or at 1 sec after, and the width of variations in dynamic surface tension should be regulated by changing the kind of surfactant and the amount thereof.

Examples of the surfactant include surfactants having an HLB (hydrophile-lipophile balance) of 14 or less. For example, by regulating the amount of a surfactant having an HLB of 14 or less, the ink is rendered easy to regulate so as to have a desired static surface tension. Furthermore, in cases when use is made of a plurality of surfactants which each have an HLB of 14 or less but which differ in HLB, it is easy to regulate the ink so as to have a desired dynamic surface tension. Specifically, in cases when, for example, a surfactant having an HLB of 11-14 and a surfactant having an HLB of 4 or higher but less than 11 are used, it is easy to regulate the ink so as to have a desired dynamic surface tension.

Incidentally, HLB (hydrophile-lipophile balance) is defined by the following equation (Griffin method).

$$HLB=20\times[(\text{total formula weight of the hydrophilic moieties})/(\text{molecular weight})]$$

Examples of such surfactants include at least one member selected from the group consisting of ethylene oxide adducts of acetylene glycol and polyether-modified silicones.

The ethylene oxide adducts of acetylene glycol are, for example, compounds obtained by causing ethylene oxide to add to at least one of the hydroxyl groups of acetylene glycol and having the structure $-O-(CH_2CH_2O)_n-H$ (n represents an integer of, for example, 1-30).

Examples of commercial products of the ethylene oxide adducts of acetylene glycol (the numerals within the parentheses are HLB values given in the catalogs) include Olfin E1004 (7-9), Olfin E1010 (13-14), Olfin EXP. 4001 (8-11), Olfin EXP. 4123 (11-14), Olfin EXP. 4300 (10-13), Surfynol 10411 (4), Surfynol 420 (4), Surfynol 440 (4), and Dynol 604 (8) [all manufactured by Nissin Chemical Industry Co., Ltd.].

The content of such an ethylene oxide adduct of acetylene glycol is, for example, desirably 0.01-10% by mass, preferably 0.1-5% by mass, based on the ink.

The polyether-modified silicones are, for example, compounds formed by bonding a polyether group, as a grafted pendant chain or as a block, to a silicone chain (polysiloxane backbone). Examples of the polyether group include a polyoxyethylene group and a polyoxypropylene group. The polyether group may be, for example, a polyoxyalkylene group composed of oxyethylene groups and oxypropylene groups which have combined together by block or random addition.

Examples of commercial products of the polyether-modified silicones (the numerals within the parentheses are HLB values given in the catalogs) include Silface SAG002 (12), Silface SAG503A (11), and Silface SAG005 (7) [all manufactured by Nissin Chemical Industry Co., Ltd.].

The content of such a polyether-modified silicone is, for example, desirably 0.01-5% by mass, preferably 0.05-1% by mass, based on the ink.

Meanwhile, in the ink set of the first exemplary embodiment of the invention, the static surface tension of ink (2) is 30 mN/m or higher, and is preferably 30-35 mN/m from the standpoint of ejection stability.

The dynamic surface tension of ink (2) as measured at 1 msec after is 38 mN/m or higher, and is preferably 38-50 mN/m, more preferably 38-45 mN/m, from the standpoint of inhibiting image blurring.

Meanwhile, the dynamic surface tension of ink (2) as measured at 1 sec after is 30 mN/m or higher, and is preferably 30-45 mN/m, more preferably 30-40 mN/m, from the standpoint of inhibiting image blurring.

The width of variations in dynamic surface tension of ink (2) is 1.5-9.0 mN/m, and is preferably 1.5-7.0 mN/m, more preferably 1.5-5.0 mN/m, from the standpoint of inhibiting image blurring.

The static surface tension and dynamic surface tensions of ink (2) are measured by the same method as for measuring the static surface tension and dynamic surface tensions of ink (1).

With respect to ink (2) also, from the standpoint of regulating ink (2) so that the static surface tension, the dynamic surface tension as measured at 1 msec after or at 1 sec after, and the width of variations in dynamic surface tension are within the ranges shown above, it is desirable, for example, that ink (2) should contain a surfactant in addition to a colorant, water, and a water-soluble organic solvent. Namely, it is desirable that the static surface tension, the dynamic surface tension as measured at 1 msec after or at 1 sec after, and the width of variations in dynamic surface tension should be regulated by changing the kind of surfactant and the amount thereof.

Examples of this surfactant also include at least one member selected from the group consisting of ethylene oxide adducts of acetylene glycol and polyether-modified silicones. Other examples thereof include known surfactants.

In the ink set according to the first exemplary embodiment, the inks of multiple colors are configured of inks of at least two colors selected, for example, from a black ink, a cyan ink, a magenta ink, a yellow ink, and inks of intermediate colors as other colors. In particular, it is desirable from the standpoint of inhibiting image blurring that a black ink should be used as ink (1) and an ink which is not black (any of a cyan ink, a magenta ink, a yellow ink, and inks of intermediate colors as other colors) be used as ink (2).

Next, the composition and properties of the water-based ink of the first exemplary embodiment of the invention and those of each ink of the ink set of the invention are explained in detail.

Ink (1) includes a colorant, a polymer particle, water, and a water-soluble organic solvent. Meanwhile, ink (2) includes a colorant of a color which is different from that of the colorant of ink (1), water, and a water-soluble organic solvent. Ink (2) may or may not contain a polymer particle.

A colorant is explained.

Examples of the colorants include pigments. Examples of the pigments include organic pigments and inorganic pigments.

Specific examples of black pigments include: Raven 7000, Raven 5750, Raven 5250, Raven 5000 ULTRAII, Raven 3500, Raven 2000, Raven 1500, Raven 1250, Raven 1200, Raven 1190 ULTRAII, Raven 1170, Raven 1255, Raven 1080, and Raven 1060 (all manufactured by Columbian Carbon Ltd.); Regal 400R, Regal 330R, Regal 660R, Mogul L, Black Pearls L, Monarch 700, Monarch 800, Monarch 880, Monarch 900, Monarch 1000, Monarch 1100, Monarch 1300, and Monarch 1400 (all manufactured by Cabot Corp.); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (all manufactured by Degussa AG); and No. 25, No. 33, No. 40, No. 47, No. 52, No. 900, No. 2300, MCF-88, MA600, MA7, MA8, and MA100 (all manufactured by Mitsubishi Chemical Corp.). However, usable black pigments are not limited to these examples.

Specific examples of cyan pigments include C.I. Pigment Blues 1, 2, 3, 15, 15:1, 15:2, 15:3, 15:4, 16, 22, and 60. However, usable cyan pigments are not limited to these examples.

Specific examples of magenta pigments include C.I. Pigment Reds 5, 7, 12, 48, 48:1, 57, 112, 122, 123, 146, 168, 177, 184, and 202 and C.I. Pigment Violet 19. However, usable magenta pigments are not limited to these examples.

Specific examples of yellow pigments include C.I. Pigment Yellows 1, 2, 3, 12, 13, 14, 16, 17, 73, 74, 75, 83, 93, 95, 97, 98, 114, 128, 129, 138, 151, 154, and 180. However, usable yellow pigments are not limited to these examples.

In the case where a pigment is used as the colorant, it is preferred to use a pigment dispersant in combination therewith. Examples of the pigment dispersant to be used include polymeric dispersants, anionic surfactants, cationic surfactants, amphoteric surfactants, and nonionic surfactants.

A suitable polymeric dispersant is a polymer which has a hydrophilic structure part and a hydrophobic structure part. As the polymer having a hydrophilic structure part and a hydrophobic structure part, use may be made of, for example, a condensation polymer and an addition polymer. Examples of the condensation polymer include known polyester-based dispersants. Examples of the addition polymer include addition polymers of monomers having an $\alpha,\beta$-ethylenically unsaturated group. By copolymerizing a monomer which has an $\alpha,\beta$-ethylenically unsaturated group and has a hydrophilic group with a monomer which has an $\alpha,\beta$-ethylenically unsaturated group and has a hydrophobic group, a desired polymeric dispersant may be obtained. Use may also be made of a homopolymer of a monomer which has an $\alpha,\beta$-ethylenically unsaturated group and has a hydrophilic group.

Examples of the monomers having an $\alpha,\beta$-ethylenically unsaturated group and having a hydrophilic group include monomers having a carboxyl group, sulfo group, hydroxyl group, phosphate group, etc., such as acrylic acid, methacrylic acid, crotonic acid, itaconic acid, itaconic acid monoesters, maleic acid, maleic acid monoesters, fumaric acid, fumaric acid monoesters, vinylsulfonic acid, styrenesulfonic acid, sulfonated vinylnapthalenes, vinyl alcohol, acrylamide, methacryloxyethyl phosphate, bismethacryloxyethyl phosphate, methacryloxyethyl phenyl acid phosphate, ethylene glycol dimethacrylate, and diethylene glycol dimethacrylate.

Examples of the monomers having an $\alpha,\beta$-ethylenically unsaturated group and having a hydrophobic group include styrene, styrene derivatives such as $\alpha$-methylstyrene and vinyltoluene, vinylcyclohexane, vinylnaphthalene, vinylnaphthalene derivatives, acrylic acid alkyl esters, methacrylic acid alkyl esters, the phenyl ester of methacrylic acid, methacrylic acid cycloalkyl esters, crotonic acid alkyl esters, itaconic acid dialkyl esters, and maleic acid dialkyl esters.

Examples of the copolymer which is a preferred polymeric dispersant include styrene/styrenesulfonic acid copolymers, styrene/maleic acid copolymers, styrene/methacrylic acid copolymers, styrene/acrylic acid copolymers, vinylnaphthalene/maleic acid copolymers, vinylnaphthalene/methacrylic acid copolymers, vinylnaphthalene/acrylic acid copolymers, alkyl acrylate/acrylic acid copolymers, alkyl methacrylate/methacrylic acid copolymers, styrene/alkyl methacrylate/methacrylic acid copolymers, styrene/alkyl acrylate/acrylic acid copolymers, styrene/phenyl methacrylate/methacrylic acid copolymers, and styrene/cyclohexyl methacrylate/methacrylic acid copolymers. Monomers having a polyoxyethylene group or a hydroxyl group may be copolymerized with these polymers.

It is desirable that the polymeric dispersant should have a weight-average molecular weight of, for example, 2,000-50,000.

Such polymeric dispersants may be used either alone or in combination of two or more thereof. The content of the polymeric dispersant cannot be unconditionally shown since the content thereof varies considerably depending on the pigment. It is, however, desirable that the content thereof should be 0.1-100% by mass based on the pigment.

Examples of the pigments further include pigments which self-disperse in water (hereinafter referred to as self-dispersion type pigments).

The term self-dispersion type pigment means a pigment which has water-soluble groups on the surface thereof and which disperses in water even in the absence of a polymeric dispersant. The self-dispersion type pigment is obtained, for example, by subjecting a pigment to a surface modification treatment such as an acid/base treatment, coupling agent treatment, polymer grafting treatment, plasma treatment, or oxidation/reduction treatment.

Other than the pigment obtained by subjecting a pigment to a surface modification treatment, examples of the self-dispersion type pigments include commercial self-dispersion type pigments such as: Cab-o-jet-200, Cab-o-jet-300, Cab-o-jet-400, IJX-157, IJX-253, IJX-266, IJX-273, IJX-444, JIX-55, Cab-o-jet-250C, Cab-o-jet-260M, Cab-o-jet-270Y, Cab-o-jet-450C, Cab-o-jet-465M, Cab-o-jet-470Y, and Cab-o-jet-480M, all manufactured by Cabot Corp.; and Microjet Black CW-1 and CW-2, manufactured by Orient Chemical Industries, Ltd.

It is preferable that the self-dispersion type pigments should be pigments which have at least a sulfonic acid, sulfonic acid salt, carboxylic acid, or carboxylic acid salt as functional groups on the surfaces thereof. More preferred is a pigment which has at least a carboxylic acid or a carboxylic acid salt as functional groups on the surface thereof.

Examples of the pigments further include pigments coated with a resin. These pigments are called microcapsule pigments, and there are commercial microcapsule pigments manufactured by DIC Corp., Toyo Ink Mfg. Co., Ltd., etc. Other than commercial microcapsule pigments, a microcapsule pigment produced in accordance with a purpose may be used.

Examples of the pigments furthermore include a resin dispersion type pigment obtained by physically adsorbing or chemically bonding a high-molecular compound to a pigment.

Other than black pigments and pigments of the three primary colors of cyan, magenta, and yellow, examples of the pigments include pigments of specific colors of red, green, blue, brown, white, etc., metallic-luster pigments of golden, silver, or other colors, colorless or light-colored extender pigments, and plastic pigments.

Examples of the pigments still further include particles obtained by fixing a dye or a pigment to the surface of silica, alumina, polymer beads, or the like as cores, lake pigments obtained by insolubilizing dyes, colored emulsions, and colored latexes.

Other than pigments, examples of the colorants include: dyes such as hydrophilic anionic dyes, direct dyes, cationic dyes, reactive dyes, polymeric dyes, and oil-soluble dyes; wax powders, resin powders, and emulsions colored with dyes; and fluorescent dyes and fluorescent pigments.

The colorants may each have a volume-average particle diameter of, for example, 10-1,000 nm.

The term "volume-average particle diameter of a colorant" means the particle diameter of the colorant itself or, in the case of a colorant to which an additive such as a dispersant is adherent, means the diameter of the particles including the adherent additive. The volume-average particle diameter is determined using particle size analyzer Microtrac UPA-UT151 (manufactured by Microtrac Inc.). In the measurement, an ink diluted 1,000 times was introduced into the measuring cell and examined. As values to be inputted for the determination, the viscosity of the diluted ink was used as the viscosity value and the refractive index of the colorant was used as the refractive index of particles.

The content (concentration) of the colorant in each ink is, for example, preferably 1-25% by mass, more preferably 2-20% by mass, based on the ink.

A polymer particle are explained.

The polymer particle is a component which enhances the fixability of ink images to impermeable recording media.

Examples of the polymer particles include particles (latex particles) of styrene/acrylic acid copolymers, styrene/acrylic acid/sodium acrylate copolymers, styrene/butadiene copolymers, polystyrene, acrylonitrile/butadiene copolymers, acrylic acid ester copolymers, polyurethanes, silicone/acrylic acid copolymers, acrylic-modified fluororesins, etc. Examples of the polymer particles further include core/shell type polymer particles in which the central part and peripheral part of each particle differ in composition.

The polymer particle may be ones which have been dispersed in the ink using an emulsifying agent, or may be ones which have been dispersed in the ink without using an emulsifying agent. Examples of the emulsifying agent include surfactants and polymers having a hydrophilic group such as a sulfo group or a carboxyl group (e.g., polymers onto which a hydrophilic group has been grafted and polymers obtained from a monomer having hydrophilicity and a monomer having a hydrophobic portion).

The volume-average particle diameter of the polymer particle is preferably 10-300 nm, more preferably 10-200 nm, from the standpoints of the glossiness and abrasion resistance of images.

The volume-average particle diameter of polymer particle is determined using particle size analyzer Microtrac UPA-UT151 (manufactured by Microtrac Inc.). In the measurement, an ink diluted 1,000 times was introduced into the measuring cell and examined. As values to be inputted for the determination, the viscosity of the diluted ink was used as the viscosity value and the refractive index of the polymer was used as the refractive index of particles.

The polymer particle has a glass transition temperature of preferably −20 to 80° C., more preferably −10 to 60° C., from the standpoint of the abrasion resistance of images.

The glass transition temperature of polymer particle is determined from a DSC curve obtained by differential scanning calorimetry (DSC). More specifically, the glass transition temperature thereof is determined in accordance with "Extrapolated Glass Transition Initiation Temperature" described under Method for Determining Glass Transition Temperature in JIS K7121-1987 "Method for Determining Transition Temperatures of Plastics".

The content of the polymer particle in each ink is, for example, preferably 0.1-10% by mass, more preferably 0.5-5% by mass, based on the ink.

The water is explained.

Suitable examples of the water include ion-exchanged water, ultrapure water, distilled water, and water purified by ultrafiltration, especially from the standpoint of preventing inclusion of impurities or proliferation of microorganisms.

The content of water in each ink is, for example, preferably 10-95% by mass, more preferably 30-90% by mass, based on the ink.

The water-soluble organic solvent is explained.

Examples of the water-soluble organic solvent include polyhydric alcohols, derivatives of polyhydric alcohols, nitrogen-containing solvents, alcohols, and sulfur-containing solvents. Other examples of the water-soluble organic solvent include propylene carbonate and ethylene carbonate.

Examples of the polyhydric alcohols include: sugar alcohols such as ethylene glycol, diethylene glycol, propylene glycol, butylene glycol, triethylene glycol, 1,5-pentanediol, 1,2-hexanediol, 1,2,6-hexanetriol, glycerin, trimethylolpropane, and xylitol; and saccharides such as xylose, glucose, and galactose.

Examples of the derivatives of polyhydric alcohols include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and ethylene oxide adducts of diglycerin.

Examples of the nitrogen-containing solvents include pyrrolidone, N-methyl-2-pyrrolidone, cyclohexylpyrrolidone, and triethanolamine.

Examples of the alcohols include ethanol, isopropyl alcohol, butyl alcohol, and benzyl alcohol.

Examples of the sulfur-containing solvents include thiodiethanol, thiodiglycerol, sulfolane, and dimethyl sulfoxide.

Such water-soluble organic solvents may be used either alone or in combination of two or more thereof.

The content of the water-soluble organic solvent is preferably 1-60% by mass, more preferably 1-40% by mass, based on the water.

Surfactants are explained.

The inks may contain other surfactants. Examples of the other surfactants include anionic surfactants, nonionic surfactants, cationic surfactants, and amphoteric surfactants. Preferred are anionic surfactants and nonionic surfactants.

Examples of the anionic surfactants include alkylbenzenesulfonic acid salts, alklylphenylsulfonic acid salts, alkylnaphthalenesulfonic acid salts, higher fatty acid salts, sulfuric acid ester salts of higher fatty acid esters, sulfonic acid salts of higher fatty acid esters, sulfuric acid ester salts and sulfonic acid salts of higher alcohol ethers, (higher-alkyl) sulfosuccinic acid salts, polyoxyethylene alkyl ether carboxylic acid salts, polyoxyethylene alkyl ether sulfuric acid salts, alkylphosphoric acid salts, and polyoxyethylene alkyl ether phosphoric acid salts.

Preferred of these anionic surfactants are dodecylbenzenesulfonic acid salts, isopropylnaphthalenesulfonic acid salts, monobutylphenylphenolmonosulfonic acid salts, monobutylbiphenylsulfonic acid salts, monobutylbiphenylsulfonic acid salts, and dibutylphenylphenoldisulfonic acid salts.

Examples of the nonionic surfactants include polyoxyethylene alkyl ethers, polyoxyethylene alkylphenyl ethers, polyoxyethylene fatty acid esters, sorbitan fatty acid esters, polyoxyethylene-sorbitan fatty acid esters, polyoxyethylene-sorbitol fatty acid esters, glycerin fatty acid esters, polyoxyethylene-glycerin fatty acid esters, polyglycerin fatty acid esters, sucrose fatty acid esters, polyoxyethylene alkylamines, polyoxyethylene fatty acid amides, alkylalkanolamides, polyethylene glycol/polypropylene glycol block copolymers, and acetylene glycol.

Preferred of these nonionic surfactants are polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene-sorbitan fatty acid esters, fatty acid alkylolamides, polyethylene glycol/polypropylene glycol block copolymers, and acetylene glycol.

Other examples of the nonionic surfactants include: silicone surfactants such as polysiloxane oxyethylene adducts; fluorochemical surfactants such as perfluoroalkylcarboxylic acid salts, perfluoroalkylsulfonic acid salts, and oxyethylene perfluoroalkyl ethers; and biosurfactants such as spiculisporic acid, rhamnolipid, and lysolecithin.

Surfactants having a hydrophile-lipophile balance (HLB) in the range of, for example, 3-20 are desirable when the solubility thereof, etc. are taken into account.

The surfactants may be used either alone or in combination of two or more thereof.

The content of the surfactant in each ink is preferably 0.1-10% by mass, more preferably 0.1-5% by mass, even more preferably 0.2-3% by mass, based on the ink.

Other additives are explained.

The inks may contain other additives. Examples of the other additives include ink ejection improvers (e.g., polyethyleneimine, polyamines, polyvinylpyrrolidone, polyethylene glycol, ethyl cellulose, and carboxymethyl cellulose), conductivity/pH regulators (e.g., compounds of alkali metals, such as potassium hydroxide, sodium hydroxide, and lithium hydroxide), reactive diluent solvents, penetrants, pH buffers, antioxidants, fungicides, viscosity modifiers, conductive agents, chelating agents, ultraviolet absorbers, and infrared absorbers.

Suitable properties of the inks (inks (1) and (2)) are explained.

The pH of each of the inks (inks (1) and (2)) may be preferably in the range of 4-10, more preferably in the range of 5-9.

The ink pH values employed here were measured with a pH/conductivity meter (MPC 227, manufactured by Mettler Toledo Inc.) in an atmosphere having a temperature of 23±0.5° C. and a humidity of 55±5% R.H.

The electrical conductivity of each of the inks (inks (1) and (2)) may be, for example, in the range of 0.01-0.5 S/m (preferably in the range of 0.01-0.25 S/m, more preferably in the range of 0.01-0.20 S/m).

Electrical conductivity is measured with MPC 227 (pH/conductivity meter; manufactured by Mettler Toledo Inc.).

The viscosity of each of the inks (inks (1) and (2)) may be, for example, in the range of 1.5-30 mPa·s (preferably in the range of 1.5-20 mPa·s).

Viscosity is measured using TV-20 (manufactured by Toki Sangyo Co., Ltd.) as a measuring device under the conditions of a measuring temperature of 23° C. and a shear rate of 1,400 s$^{-1}$.

[Ink]

The ink of the second exemplary embodiment of the invention includes a colorant, a polymer particle, water, and a water-soluble organic solvent, the content of the polymer particle being 2-10% by mass based on the ink, and has a static surface tension of 30 mN/m or less and, when examined for dynamic surface tension by the maximum bubble pressure method, has a width of variations in dynamic surface tension for the period from 1 msec after to 1 sec after (hereinafter also referred to simply as "width of variations in dynamic surface tension") of 0.2-2.0 mN/m.

A press-bonding postal card in which recorded information is concealable is known as one kind of press-bonding paper configured of a base and a pressure-sensitive adhesive layer formed on at least one surface of the base.

In the case of this press-bonding postal card, an image is recorded on the pressure-sensitive adhesive layer. The postal card is then folded in two (V shape) or in three (Z shape), with the image-bearing surface facing inward, and the opposed surfaces are press-bonded to each other, thereby concealing the recorded image.

In particular, in the case where such a press-bonding postal card is for ink-jet recording, the pressure-sensitive adhesive layer formed on the base functions also as an ink-receiving layer which receives inks ejected by ink-jet recording.

In cases when an ink is ejected by ink-jet recording onto the pressure-sensitive adhesive layer serving also as an ink-receiving layer, the ink delivered infiltrates into the pressure-sensitive adhesive layer and dries, thereby recording an image. Thereafter, press-bonding is conducted to produce a press-bonded postal card (printed card).

However, there have been cases where use of conventional inks arouses a trouble that the recorded image (ink) is undesirably transferred to the opposed surface when the press-bonded portions of the printed press-bonded postal card are peeled off.

Although investigations have been made on, for example, the components of the pressure-sensitive adhesive layer in order to mitigate the image transfer to the opposed surface as described in patent document 2, the effect thereof is insufficient.

The ink of the second exemplary embodiment of the invention contains a polymer particle in a specific amount and has been regulated so that the static surface tension thereof and the width of variations in dynamic surface tension thereof are within the ranges shown above.

An ink having a static surface tension within the range and a width of variations in dynamic surface tension within the range is an ink which has a reduced static surface tension and a reduced width of variations in dynamic surface tension. Namely, the feature indicates that this ink has the property of spreading on and wetting the surface while being inhibited from infiltrating, even on the pressure-sensitive adhesive layer serving also as an ink-receiving layer.

When this ink spreads on and wets the pressure-sensitive adhesive layer serving also as an ink-receiving layer, the polymer particle contained therein in a specific amount moves to the image surface to produce a film-forming effect, thereby forming a film layer of the polymer in the vicinity of the image surface. This film layer formed in the vicinity of the image surface is either a layer of aggregated polymer particles or a layer in which at least some of the polymer particles have undergone self-fusion bonding. It is thought that the presence of this film layer can reduce the force of adhesion of the image to the opposed surface.

Consequently, the image recorded on the pressure-sensitive adhesive layer of press-bonding paper, e.g., a press-bonding postal card, using the ink of the second exemplary embodiment of the invention can be inhibited, by the presence of the polymer film layer, from being undesirably transferred to the opposed surface when the press-bonded portions are peeled off after press bonding.

In the ink of the second exemplary embodiment of the invention, the static surface tension thereof is 30 mN/m or less, and is preferably 21-30 mN/m from the standpoint of ejection stability.

The values of static surface tension were measured in an atmosphere of 23° C. and 55% RH using Wilhelmy surface tension balance CBVP-Z (manufactured by Kyowa Interface Science Co., Ltd.).

The width of variations in dynamic surface tension of the ink of the second exemplary embodiment of the invention is 0.2-2.0 mN/m. From the standpoint of enabling the ink to spread and wet in a shorter time period to come into an even film state, the width of variations in dynamic surface tension thereof is preferably 0.2-1.8 mN/m, more preferably 0.2-1.5 mN/m.

Incidentally, the width of variations in dynamic surface tension is the difference between the value of dynamic surface tension measured at 1 msec after and the value of dynamic surface tension measured at 1 sec after.

From the standpoint of enabling the ink to spread and wet in a shorter time period to come into an even film state, the dynamic surface tension of the ink of the second exemplary embodiment of the invention as measured at 1 msec after is preferably 32 mN/m or less, more preferably 21-30 mN/m, even more preferably 22-28 mN/m.

Meanwhile, the dynamic surface tension of the ink as measured at 1 sec after is preferably 30 mN/m or less, more preferably 21-28 mN/m, even more preferably 22-28 mN/m, from the standpoint of rendering an even film state possible.

The values of dynamic surface tension were measured in an atmosphere of 23° C. and 55% RH using dynamic surface tensiometer MPT-C (manufactured by Lauda GmbH), which is based on the maximum bubble pressure method.

Incidentally, the value of dynamic surface tension as measured at 1 msec after is the value of dynamic surface tension measured at the time when 1 msec has passed since a new interface was formed at the end of the capillary and when a maximum bubble pressure is reached. It is, however, noted that in dynamic surface tensiometers based on the maximum bubble pressure method in which a limit of measurement is a dynamic surface tension measured at 1 msec after, there are cases where this value is expressed as dynamic surface tension measured at 0 msec after. In this case, the value of dynamic surface tension measured at 0 msec after is taken as a value of dynamic surface tension measured at 1 msec after.

Meanwhile, the value of dynamic surface tension as measured at 1 sec after is the value of dynamic surface tension measured at the time when 1 sec has passed since a new interface was formed at the end of the capillary and when a maximum bubble pressure is reached. It is, however, noted that in dynamic surface tensiometers based on the maximum bubble pressure method in which a limit of measurement is a dynamic surface tension measured at less than 1 sec after, the value of dynamic surface tension measured at the limit of measurement is taken as a value of dynamic surface tension measured at 1 sec after. This is because so long as the value of dynamic surface tension is one measured at the limit of measurement, it is possible to determine that the dynamic surface tension was in a stable region.

From the standpoint of regulating the ink of the second exemplary embodiment of the invention so that the static surface tension, the width of variations in dynamic surface tension, and the dynamic surface tension as measured at 1 msec after or at 1 sec after are within the ranges shown above, it is desirable, for example, that the ink should contain a surfactant in addition to a colorant, a polymer particle, water, and a water-soluble organic solvent. Namely, it is desirable that the static surface tension, the width of variations in dynamic surface tension, and the dynamic surface tension as measured at 1 msec after or at 1 sec after should be regulated by changing the kind of surfactant and the amount thereof Examples of the surfactant include surfactants having an HLB (hydrophile-lipophile balance) of 14 or less. For example, by regulating the amount of a surfactant having an HLB of 14 or less, the ink is rendered easy to regulate so as to have a desired static surface tension. Furthermore, in cases when use is made of a plurality of surfactants which each have an HLB of 14 or less but which differ in HLB, it is easy to regulate the ink so as to have a desired dynamic surface tension. Specifically, in cases when, for example, a surfactant having an HLB of 9-14 and a surfactant having an HLB of 4-8 are used, it is easy to regulate the ink so as to have a desired dynamic surface tension.

Incidentally, HLB (hydrophile-lipophile balance) is defined by the following equation (Griffin method).

$$HLB = 20 \times [(\text{total formula weight of the hydrophilic moieties})/(\text{molecular weight})]$$

Examples of such surfactants include at least one member selected from the group consisting of ethylene oxide adducts of acetylene glycol and polyether-modified silicones.

The ethylene oxide adducts of acetylene glycol are, for example, compounds obtained by causing ethylene oxide to add to at least one of the hydroxyl groups of acetylene glycol and having the structure —O—$(CH_2CH_2O)_n$—H (n represents an integer of, for example, 1-30).

Examples of commercial products of the ethylene oxide adducts of acetylene glycol (the numerals within the parentheses are HLB values given in the catalogs) include Olfin E1004 (7-9), Olfin E1010 (13-14), Olfin EXP. 4001 (8-11), Olfin EXP. 4123 (11-14), Olfin EXP. 4300 (10-13), Surfynol 104H (4), Surfynol 420 (4), Surfynol 440 (4), and Dynol 604 (8) [all manufactured by Nissin Chemical Industry Co., Ltd.].

The content of such an ethylene oxide adduct of acetylene glycol is, for example, desirably 0.01-10% by mass, preferably 0.1-5% by mass, based on the ink.

The polyether-modified silicones are, for example, compounds formed by bonding a polyether group, as a grafted pendant chain or as a block, to a silicone chain (polysiloxane backbone). Examples of the polyether group include a polyoxyethylene group and a polyoxypropylene group. The polyether group may be, for example, a polyoxyalkylene group composed of oxyethylene groups and oxypropylene groups which have combined together by block or random addition.

Examples of commercial products of the polyether-modified silicones (the numerals within the parentheses are HLB values given in the catalogs) include Silface SAG002 (12), Silface SAG503A (11), and Silface SAG005 (7) [all manufactured by Nissin Chemical Industry Co., Ltd.].

The content of such a polyether-modified silicone is, for example, desirably 0.01-5% by mass, preferably 0.05-1% by mass, based on the ink.

Next, the composition and properties of the ink of the second exemplary embodiment of the invention are explained in detail.

The ink of the second exemplary embodiment of the invention includes a colorant, a polymer particle, water, and a water-soluble organic solvent.

—Colorant—

First, the colorant is explained.

A colorant suitable for the desired hue of the ink may be used. Examples thereof include pigments. Examples of the pigments include organic pigments and inorganic pigments.

As the examples of the pigments, the same as above can be exemplified.

In the case where a pigment is used as the colorant, it is preferred to use a pigment dispersant in combination therewith. Examples of the pigment dispersant to be used include polymeric dispersants, anionic surfactants, cationic surfactants, amphoteric surfactants, and nonionic surfactants. As the examples of these, the same as mentioned above can be exemplified.

The content (concentration) of the colorant in each ink is, for example, preferably 1-25% by mass, more preferably 2-20% by mass, based on the ink.

—Polymer Particle—

The polymer particle is explained.

The polymer particle is a component which enhances the fixability of ink images and forms a film layer around an image surface.

As the examples of the polymer particle, the same as mentioned above can be exemplified.

The content of the polymer particle in each ink is preferably 2.0% by mass or more, more preferably 3.0% by mass or more, more preferably 5.0% by mass or more, based on the ink from the standpoint of the forming property of the film layer.

The content of the polymer particle in each ink is preferably 10% by mass or less, more preferably 7.0% by mass or less, based on the ink, in view of discharge stability.

—Water—

The water is explained.

Suitable examples of the water include ion-exchanged water, ultrapure water, distilled water, and water purified by ultrafiltration, especially from the standpoint of preventing inclusion of impurities or proliferation of microorganisms.

The content of water in each ink is, for example, preferably 10-95% by mass, more preferably 30-90% by mass, based on the ink.

—Water-Soluble Organic Solvent—

The water-soluble organic solvent is explained.

Examples of the water-soluble organic solvent include polyhydric alcohols, derivatives of polyhydric alcohols, nitrogen-containing solvents, alcohols, and sulfur-containing solvents. Other examples of the water-soluble organic solvent include propylene carbonate and ethylene carbonate.

Examples of the polyhydric alcohols include: sugar alcohols such as ethylene glycol, diethylene glycol, propylene glycol, butylene glycol, triethylene glycol, 1,5-pentanediol, 1,2-hexanediol, 1,2,6-hexanetriol, glycerin, trimethylolpropane, and xylitol; and saccharides such as xylose, glucose, and galactose.

Examples of the derivatives of polyhydric alcohols include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and ethylene oxide adducts of diglycerin.

Examples of the nitrogen-containing solvents include pyrrolidone, N-methyl-2-pyrrolidone, cyclohexylpyrrolidone, and triethanolamine.

Examples of the alcohols include ethanol, isopropyl alcohol, butyl alcohol, and benzyl alcohol.

Examples of the sulfur-containing solvents include thiodiethanol, thiodiglycerol, sulfolane, and dimethyl sulfoxide.

Such water-soluble organic solvents may be used either alone or in combination of two or more thereof.

The content of the water-soluble organic solvent is preferably 1-60% by mass, more preferably 1-40% by mass, based on the water.

—Surfactant—

A surfactant is explained.

The inks may contain other surfactant except for the above-mentioned ethylene oxide adduct of acetylene glycol and polyether-modified silicone.

Examples of the other surfactants include anionic surfactants, nonionic surfactants, cationic surfactants, and amphoteric surfactants. Preferred are anionic surfactants and nonionic surfactants.

Examples of the anionic surfactants include alkylbenzenesulfonic acid salts, alklylphenylsulfonic acid salts, alkylnaphthalenesulfonic acid salts, higher fatty acid salts, sulfuric acid ester salts of higher fatty acid esters, sulfonic acid salts of higher fatty acid esters, sulfuric acid ester salts and sulfonic acid salts of higher alcohol ethers, (higher-alkyl) sulfosuccinic acid salts, polyoxyethylene alkyl ether carboxylic acid salts, polyoxyethylene alkyl ether sulfuric acid salts, alkylphosphoric acid salts, and polyoxyethylene alkyl ether phosphoric acid salts.

Preferred of these anionic surfactants are dodecylbenzenesulfonic acid salts, isopropylnaphthalenesulfonic acid salts, monobutylphenylphenolmonosulfonic acid salts, monobutylbiphenylsulfonic acid salts, monobutylbiphenylsulfonic acid salts, and dibutylphenylphenoldisulfonic acid salts.

Examples of the nonionic surfactants include polyoxyethylene alkyl ethers, polyoxyethylene alkylphenyl ethers, polyoxyethylene fatty acid esters, sorbitan fatty acid esters, polyoxyethylene-sorbitan fatty acid esters, polyoxyethylene-sorbitol fatty acid esters, glycerin fatty acid esters, polyoxyethylene-glycerin fatty acid esters, polyglycerin fatty acid esters, sucrose fatty acid esters, polyoxyethylene alkylamines, polyoxyethylene fatty acid amides, alkylalkanolamides, polyethylene glycol/polypropylene glycol block copolymers, and acetylene glycol.

Preferred of these nonionic surfactants are polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene-sorbitan fatty acid esters, fatty acid alkylolamides, polyethylene glycol/polypropylene glycol block copolymers, and acetylene glycol.

Other examples of the nonionic surfactants include: silicone surfactants such as polysiloxane oxyethylene adducts; fluorochemical surfactants such as perfluoroalkylcarboxylic acid salts, perfluoroalkylsulfonic acid salts, and oxyethylene perfluoroalkyl ethers; and biosurfactants such as spiculisporic acid, rhamnolipid, and lysolecithin.

Other surfactant having a hydrophile-lipophile balance (HLB) in the range of, for example, 3-20 is desirable when the solubility thereof, etc. is taken into account.

Other surfactant may be used either alone or in combination of two or more thereof.

The content of other surfactant in each ink is preferably 0.1-10% by mass, more preferably 0.1-5% by mass, even more preferably 0.2-3% by mass, based on the ink.

—Other Additives—

Other additives are explained.

The inks may contain other additives. As the examples of other additives, the same as mentioned above can be exemplified.

—Properties of the Ink—

Suitable properties of the ink are explained.

The pH of the ink may be preferably in the range of 4-10, more preferably in the range of 5-9.

The ink pH values employed here were measured with a pH/conductivity meter (MPC 227, manufactured by Mettler Toledo Inc.) in an atmosphere having a temperature of 23±0.5° C. and a humidity of 55±5% R.H.

The electrical conductivity of the ink may be, for example, in the range of 0.01-0.5 S/m (preferably in the range of 0.01-0.25 S/m, more preferably in the range of 0.01-0.20 S/m).

Electrical conductivity is measured with MPC 227 (pH/conductivity meter; manufactured by Mettler Toledo Inc.).

The viscosity of the ink may be, for example, in the range of 1.5-30 mPa·s (preferably in the range of 1.5-20 mPa·s).

Viscosity is measured using TV-20 (manufactured by Told Sangyo Co., Ltd.) as a measuring device under the conditions of a measuring temperature of 23° C. and a shear rate of 1,400 $s^{-1}$.

The ink of the second exemplary embodiment of the invention may be, for example, any of a black ink, a cyan ink, a magenta ink, a yellow ink, and inks of intermediate colors which are not these colors.

The ink of the second exemplary embodiment of the invention may be used as an ink set in which at least one of the inks is the ink of the invention (preferably, all the inks each are the ink of the invention).

(Ink Set)

The ink set of the third exemplary embodiment of the invention includes water-based inks (hereinafter also referred to simply as "inks") of multiple colors different from each other, the inks each including a colorant, a polymer particle, water, and a water-soluble organic solvent. Each ink has a static surface tension of 28 mN/m or less and, when examined for dynamic surface tension by the maximum bubble pressure method, has a width of variations in dynamic surface tension for the period from 1 msec after to 1 sec after (hereinafter also referred to simply as "width of variations in dynamic surface tension") of 0.2-2.0 mN/m.

The difference in the width of variations in dynamic surface tension between the water-based inks of multiple colors is 0-1.0 mN/m.

In cases when an ink is ejected onto an impermeable recording medium, the ink droplets delivered to the recording medium do not infiltrate or are less apt to infiltrate into the recording medium and, hence, these ink droplets in the state of having a height remain on the surface of the recording medium even at the time when next ink droplets are delivered. Because of this, the ink is difficult to dry on the impermeable recording medium, and there are cases where a contact of a roller member (cooling roller, conveying roller, etc.) with the image-bearing surface immediately after image recording with the ink results in image peeling. Especially in cases when an image was recorded with inks of multiple colors, image peeling occurs considerably. Consequently, there is a desire for inks of multiple colors which themselves each have the property of quickly drying on impermeable recording media.

Although it is known to evaporate and dry inks by heating (thermal drying) in order to quickly dry the inks on impermeable recording media, this technique results in increases in energy consumption and equipment.

In the ink set of the third exemplary embodiment of the invention, not only each of the inks of multiple colors has been regulated so that the static surface tension and the width of variations in dynamic surface tension are within the ranges shown above but also the difference in the width of variations in dynamic surface tension between the inks of multiple colors is within the range shown above.

An ink having a static surface tension within the range and having a width of variations in dynamic surface tension within the range is an ink which has a reduced static surface tension and a reduced width of variations in dynamic surface tension. Namely, the feature indicates that this ink has the property of quickly spreading on and wetting impermeable recording media. Since this ink quickly spreads on and wets impermeable recording media, quick drying is rendered possible even in the case where the ink does not infiltrate or is less apt to infiltrate into the recording medium. In addition, in cases when inks of multiple colors which have that property are regulated so that the difference in the width of variations in dynamic surface tension between the inks is reduced to a value within the range, the inks of multiple colors have a reduced difference in drying rate. Namely, when an image is formed from these inks of multiple colors, all the inks dry similarly quickly. Consequently, even when the image-bearing surface comes into contact with a roller member immediately after image recording with the inks, the image is inhibited from peeling off.

As described above, the ink set of the third exemplary embodiment of the invention, even when the inks of multiple colors are applied to an impermeable recording medium, is effective in inhibiting the image formed from the inks from peeling off. It is, however, noted that those reasons for the inhibition of image peeling are a presumption and should not be restrictively construed at all.

Examples of the impermeable recording medium include coated paper and resin films. Specifically, the term "impermeable recording medium" means a recording medium in which, in an examination with a dynamic scanning liquid absorption meter, the maximum ink absorption in a contact time of 500 ms is 15 mL/$m^2$ or less.

In the ink set of the third exemplary embodiment of the invention, the static surface tension of each ink is 28 mN/m or less, and is preferably 21-28 mN/m from the standpoint of ejection stability.

The values of static surface tension were measured in an atmosphere of 23° C. and 55% RH using Wilhelmy surface tension balance CBVP-Z (manufactured by Kyowa Interface Science Co., Ltd.).

The width of variations in dynamic surface tension of each ink is 0.2-2.0 mN/m. From the standpoint of inhibiting image peeling, the width of variations in dynamic surface tension thereof is preferably 0.2-1.8 mN/m, more preferably 0.2-1.5 mN/m. Incidentally, the width of variations in dynamic surface tension is the difference between the value of dynamic surface tension measured at 1 msec after and the value of dynamic surface tension measured at 1 sec after.

From the standpoint of inhibiting image peeling, the dynamic surface tension of each ink as measured at 1 msec after is preferably 32 mN/m or less, more preferably 21-30 mN/m, even more preferably 22-28 mN/m.

Meanwhile, the dynamic surface tension of each ink as measured at 1 sec after is preferably 30 mN/m or less, more preferably 21-28 mN/m, even more preferably 22-28 mN/m, from the standpoint of inhibiting image peeling.

The difference in the width of variations in dynamic surface tension between the inks is 0-1.0 mN/m. From the standpoint of inhibiting image peeling, the difference therein is preferably 0-0.9 mN/m, more preferably 0-0.5 mN/m. Incidentally, the difference in the width of variations in dynamic surface tension is given in terms of absolute value.

The values of dynamic surface tension were measured in an atmosphere of 23° C. and 55% RH using dynamic surface tensiometer MPT C (manufactured by Lauda GmbH), which is based on the maximum bubble pressure method.

Incidentally, the value of dynamic surface tension as measured at 1 msec after is the value of dynamic surface tension measured at the time when 1 msec has passed since a new interface was formed at the end of the capillary and when a maximum bubble pressure is reached. It is, however, noted that in dynamic surface tensiometers based on the maximum bubble pressure method in which a displayed limit of measurement is a dynamic surface tension measured at 1 msec after, there are cases where this value is expressed as dynamic surface tension measured at 0 msec after. In this case, the value of dynamic surface tension measured at 0 msec after is taken as a value of dynamic surface tension measured at 1 msec after.

Meanwhile, the value of dynamic surface tension as measured at 1 sec after is the value of dynamic surface tension measured at the time when 1 sec has passed since a new interface was formed at the end of the capillary and when a maximum bubble pressure is reached. It is, however, noted that in dynamic surface tensiometers based on the maximum bubble pressure method in which a limit of measurement is a dynamic surface tension measured at less than 1 sec after, the value of dynamic surface tension measured at the limit of measurement is taken as a value of dynamic surface tension measured at 1 sec after. This is because so long as the value of dynamic surface tension is one measured at the limit of measurement, it is possible to determine that the dynamic surface tension was in a stable region.

From the standpoint of regulating each ink so that the static surface tension, the width of variations in dynamic surface tension, the difference in the width of variations in dynamic surface tension, and the dynamic surface tension as measured at 1 msec after or at 1 sec after are within the ranges shown above, it is desirable, for example, that each ink should contain a surfactant in addition to a colorant, a polymer particle, water, and a water-soluble organic solvent. Namely, it is desirable that the static surface tension, the width of variations in dynamic surface tension, the difference in the width of variations in dynamic surface tension, and the dynamic surface tension as measured at 1 msec after or at 1 sec after should be regulated by changing the kind of surfactant and the amount thereof.

Examples of the surfactant include surfactants having an HLB (hydrophile-lipophile balance) of 14 or less. For example, by regulating the amount of a surfactant having an HLB of 14 or less, the ink is rendered easy to regulate so as to have a desired static surface tension. Furthermore, in cases when use is made of a plurality of surfactants which each have an HLB of 14 or less but which differ in HLB, it is easy to regulate the ink so as to have a desired dynamic surface tension. Specifically, in cases when, for example, a surfactant having an HLB of 11-14 and a surfactant having an HLB of 4 or higher but less than 11 are used, it is easy to regulate the ink so as to have a desired dynamic surface tension.

Incidentally, HLB (hydrophile-lipophile balance) is defined by the following equation (Griffin method).

HLB=20×[(total formula weight of the hydrophilic moieties)/(molecular weight)]

Examples of such surfactants include at least one member selected from the group consisting of ethylene oxide adducts of acetylene glycol and polyether-modified silicones.

The ethylene oxide adducts of acetylene glycol are, for example, compounds obtained by causing ethylene oxide to add to at least one of the hydroxyl groups of acetylene glycol and having the structure —O—$(CH_2CH_2O)_n$—H (n represents an integer of, for example, 1-30).

Examples of commercial products of the ethylene oxide adducts of acetylene glycol (the numerals within the parentheses are HLB values given in the catalogs) include Olfin E1004 (7-9), Olfin E1010 (13-14), Olfin EXP. 4001 (8-11), Olfin EXP. 4123 (11-14), Olfin EXP. 4300 (10-13), Surfynol 104H (4), Surfynol 420 (4), Surfynol 440 (4), and Dynol 604 (8) [all manufactured by Nissin Chemical Industry Co., Ltd.].

The content of such an ethylene oxide adduct of acetylene glycol is, for example, desirably 0.01-10% by mass, preferably 0.1-5% by mass, based on the ink.

The polyether-modified silicones are, for example, compounds formed by bonding a polyether group, as a grafted pendant chain or as a block, to a silicone chain (polysiloxane backbone). Examples of the polyether group include a polyoxyethylene group and a polyoxypropylene group. The polyether group may be, for example, a polyoxyalkylene group composed of oxyethylene groups and oxypropylene groups which have combined together by block or random addition.

Examples of commercial products of the polyether-modified silicones (the numerals within the parentheses are HLB values given in the catalogs) include Silface SAG002 (12), Silface SAG503A (11), and Silface SAG005 (7) [all manufactured by Nissin Chemical Industry Co., Ltd.].

The content of such a polyether-modified silicone is, for example, desirably 0.01-5% by mass, preferably 0.05-1% by mass, based on the ink.

In the ink set according to the third exemplary embodiment, the inks of multiple colors are configured of inks of at least two colors selected, for example, from a black ink, a cyan ink, a magenta ink, a yellow ink, and inks of intermediate colors as other colors. The ink set may be configured of inks of multiple colors excluding black (for example, inks of at least two colors selected from a cyan ink, a magenta ink, a yellow ink, and inks of intermediate colors as other colors). It is preferable that this ink set should be configured of inks of three colors, i.e., a cyan ink, a magenta ink, and a yellow ink.

Next, the composition and properties of each ink of the ink set of the third exemplary embodiment of the invention are explained in detail.

The inks of the ink set respectively contain colorants which differ in color from each other. Each ink contains a polymer particle, water, and a water-soluble organic solvent other than the colorant.

The colorants are explained.

Examples of the colorants include pigments. Examples of the pigments include organic pigments and inorganic pigments.

Specific examples of black pigments include: Raven 7000, Raven 5750, Raven 5250, Raven 5000 ULTRAII, Raven 3500, Raven 2000, Raven 1500, Raven 1250, Raven 1200, Raven 1190 ULTRAII, Raven 1170, Raven 1255, Raven 1080, and Raven 1060 (all manufactured by Columbian Carbon Ltd.); Regal 400R, Regal 330R, Regal 660R, Mogul L, Black Pearls L, Monarch 700, Monarch 800, Monarch 880, Monarch 900, Monarch 1000, Monarch 1100, Monarch 1300, and Monarch 1400 (all manufactured by Cabot Corp.); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (all manufactured by Degussa AG); and No. 25, No. 33, No. 40, No. 47, No. 52, No. 900, No. 2300, MCF-88, MA600, MA7, MA8, and MA100 (all manufactured by Mitsubishi Chemical Corp.). However, usable black pigments are not limited to these examples.

Specific examples of cyan pigments include C.I. Pigment Blues 1, 2, 3, 15, 15:1, 15:2, 15:3, 15:4, 16, 22, and 60. However, usable cyan pigments are not limited to these examples.

Specific examples of magenta pigments include C.I. Pigment Reds 5, 7, 12, 48, 48:1, 57, 112, 122, 123, 146, 168, 177, 184, and 202 and C.I. Pigment Violet 19. However, usable magenta pigments are not limited to these examples.

Specific examples of yellow pigments include C.I. Pigment Yellows 1, 2, 3, 12, 13, 14, 16, 17, 73, 74, 75, 83, 93, 95, 97, 98, 114, 128, 129, 138, 151, 154, and 180. However, usable yellow pigments are not limited to these examples.

In the case where a pigment is used as the colorant, it is preferred to use a pigment dispersant in combination therewith. Examples of the pigment dispersant to be used include polymeric dispersants, anionic surfactants, cationic surfactants, amphoteric surfactants, and nonionic surfactants.

A suitable polymeric dispersant is a polymer which has a hydrophilic structure part and a hydrophobic structure part. As the polymer having a hydrophilic structure part and a hydrophobic structure part, use may be made of, for example, a condensation polymer and an addition polymer. Examples of the condensation polymer include known polyester-based dispersants. Examples of the addition polymer include addition polymers of monomers having an α,β-ethylenically unsaturated group. By copolymerizing a monomer which has an α,β-ethylenically unsaturated group and has a hydrophilic group with a monomer which has an α,β-ethylenically unsaturated group and has a hydrophobic group, a desired polymeric dispersant may be obtained. Use may also be made of a homopolymer of a monomer which has an α,β-ethylenically unsaturated group and has a hydrophilic group.

Examples of the monomers having an α,β-ethylenically unsaturated group and having a hydrophilic group include monomers having a carboxyl group, sulfo group, hydroxyl group, phosphate group, etc., such as acrylic acid, methacrylic acid, crotonic acid, itaconic acid, itaconic acid monoesters, maleic acid, maleic acid monoesters, fumaric acid, fumaric acid monoesters, vinylsulfonic acid, styrenesulfonic acid, sulfonated vinylnapthalenes, vinyl alcohol, acrylamide, methacryloxyethyl phosphate, bismethacryloxyethyl phosphate, methacryloxyethyl phenyl acid phosphate, ethylene glycol dimethacrylate, and diethylene glycol dimethacrylate.

Examples of the monomers having an α,β-ethylenically unsaturated group and having a hydrophobic group include styrene, styrene derivatives such as α-methylstyrene and vinyltoluene, vinylcyclohexane, vinylnaphthalene, vinylnaphthalene derivatives, acrylic acid alkyl esters, methacrylic acid alkyl esters, the phenyl ester of methacrylic acid, methacrylic acid cycloalkyl esters, crotonic acid alkyl esters, itaconic acid dialkyl esters, and maleic acid dialkyl esters.

Examples of the copolymer which is a preferred polymeric dispersant include styrene/styrenesulfonic acid copolymers, styrene/maleic acid copolymers, styrene/methacrylic acid copolymers, styrene/acrylic acid copolymers, vinylnaphthalene/maleic acid copolymers, vinylnaphthalene/methacrylic acid copolymers, vinylnaphthalene/acrylic acid copolymers, alkyl acrylate/acrylic acid copolymers, alkyl methacrylate/methacrylic acid copolymers, styrene/alkyl methacrylate/methacrylic acid copolymers, styrene/alkyl acrylate/acrylic acid copolymers, styrene/phenyl methacrylate/methacrylic acid copolymers, and styrene/cyclohexyl methacrylate/methacrylic acid copolymers. Monomers having a polyoxyethylene group or a hydroxyl group may be copolymerized with these polymers.

It is desirable that the polymeric dispersant should have a weight-average molecular weight of, for example, 2,000-50,000.

Such polymeric dispersants may be used either alone or in combination of two or more thereof. The content of the polymeric dispersant cannot be unconditionally shown since the content thereof varies considerably depending on the pigment. It is, however, desirable that the content thereof should be 0.1-100% by mass based on the pigment.

Examples of the pigments further include pigments which self-disperse in water (hereinafter referred to as self-dispersion type pigments).

The term self-dispersion type pigment means a pigment which has water-soluble groups on the surface thereof and which disperses in water even in the absence of a polymeric dispersant. The self-dispersion type pigment is obtained, for example, by subjecting a pigment to a surface modification treatment such as an acid/base treatment, coupling agent treatment, polymer grafting treatment, plasma treatment, or oxidation/reduction treatment.

Other than the pigment obtained by subjecting a pigment to a surface modification treatment, examples of the self-dispersion type pigments include commercial self-dispersion type pigments such as: Cab-o-jet-200, Cab-o-jet-300, Cab-o-jet-400, IJX-157, IJX-253, IJX-266, IJX-273, IJX-444, Cab-o-jet-250C, Cab-o-jet-260M, Cab-o-jet-270Y, Cab-o-jet-450C, Cab-o-jet-465M, Cab-o-jet-470Y, and Cab-o-jet-480M, all manufactured by Cabot Corp.; and Microjet Black CW-1 and CW-2, manufactured by Orient Chemical Industries, Ltd.

It is preferable that the self-dispersion type pigments should be pigments which have at least a sulfonic acid, sulfonic acid salt, carboxylic acid, or carboxylic acid salt as functional groups on the surfaces thereof. More preferred is a pigment which has at least a carboxylic acid or a carboxylic acid salt as functional groups on the surface thereof.

Examples of the pigments further include pigments coated with a resin. These pigments are called microcapsule pigments, and there are commercial microcapsule pigments manufactured by DIC Corp., Toyo Ink Mfg. Co., Ltd., etc. Other than commercial microcapsule pigments, a microcapsule pigment produced in accordance with a purpose may be used.

Examples of the pigments furthermore include a resin dispersion type pigment obtained by physically adsorbing or chemically bonding a high-molecular compound to a pigment.

Other than black pigments and pigments of the three primary colors of cyan, magenta, and yellow, examples of the pigments include pigments of specific colors of red, green, blue, brown, white, etc., metallic-luster pigments of golden, silver, or other colors, colorless or light-colored extender pigments, and plastic pigments.

Examples of the pigments still further include particles obtained by fixing a dye or a pigment to the surface of silica, alumina, polymer beads, or the like as cores, lake pigments obtained by insolubilizing dyes, colored emulsions, and colored latexes.

Other than pigments, examples of the colorants include: dyes such as hydrophilic anionic dyes, direct dyes, cationic dyes, reactive dyes, polymeric dyes, and oil-soluble dyes; wax powders, resin powders, and emulsions colored with dyes; and fluorescent dyes and fluorescent pigments.

The colorants may each have a volume-average particle diameter of, for example, 10-1,000 nm.

The term "volume-average particle diameter of a colorant" means the particle diameter of the colorant itself or, in the case of a colorant to which an additive such as a dispersant is adherent, means the diameter of the particles including the adherent additive. The volume-average particle diameter is determined using particle size analyzer Microtrac UPA-UT151 (manufactured by Microtrac Inc.). In the measurement, an ink diluted 1,000 times was introduced into the measuring cell and examined. As values to be inputted for the determination, the viscosity of the diluted ink was used as the viscosity value and the refractive index of the colorant was used as the refractive index of particles.

The content (concentration) of the colorant in each ink is, for example, preferably 1-25% by mass, more preferably 2-20% by mass, based on the ink.

The polymer particle is explained.

The polymer particle is a component which enhances the fixability of ink images to impermeable recording media.

Examples of the polymer particles include particles (latex particles) of styrene/acrylic acid copolymers, styrene/acrylic acid/sodium acrylate copolymers, styrene/butadiene copolymers, polystyrene, acrylonitrile/butadiene copolymers, acrylic acid ester copolymers, polyurethanes, silicone/acrylic acid copolymers, acrylic-modified fluororesins, etc. Examples of the polymer particles further include core/shell type polymer particles in which the central part and peripheral part of each particle differ in composition.

The polymer particles may be ones which have been dispersed in the ink using an emulsifying agent, or may be ones which have been dispersed in the ink without using an emulsifying agent. Examples of the emulsifying agent include surfactants and polymers having a hydrophilic group such as a sulfo group or a carboxyl group (e.g., polymers onto which a hydrophilic group has been grafted and polymers obtained from a monomer having hydrophilicity and a monomer having a hydrophobic portion).

The volume-average particle diameter of the polymer particle is preferably 10-300 nm, more preferably 10-200 nm, from the standpoints of the glossiness and abrasion resistance of images.

The volume-average particle diameter of polymer particle is determined using particle size analyzer Microtrac UPA-UT151 (manufactured by Microtrac Inc.). In the measurement, an ink diluted 1,000 times was introduced into the measuring cell and examined. As values to be inputted for the determination, the viscosity of the diluted ink was used as the viscosity value and the refractive index of the polymer was used as the refractive index of particles.

The polymer particle has a glass transition temperature of preferably −20 to 80° C., more preferably −10 to 60° C., from the standpoint of the abrasion resistance of images.

The glass transition temperature of the polymer particle is determined from a DSC curve obtained by differential scanning calorimetry (DSC). More specifically, the glass transition temperature thereof is determined in accordance with "Extrapolated Glass Transition Initiation Temperature" described under Method for Determining Glass Transition Temperature in JIS K7121-1987 "Method for Determining Transition Temperatures of Plastics".

The content of the polymer particle in each ink is, for example, preferably 0.1-10% by mass, more preferably 0.5-5% by mass, based on the ink.

The water is explained.

Suitable examples of the water include ion-exchanged water, ultrapure water, distilled water, and water purified by ultrafiltration, especially from the standpoint of preventing inclusion of impurities or proliferation of microorganisms.

The content of water in each ink is, for example, preferably 10-95% by mass, more preferably 30-90% by mass, based on the ink.

The water-soluble organic solvent is explained.

Examples of the water-soluble organic solvent include polyhydric alcohols, derivatives of polyhydric alcohols, nitrogen-containing solvents, alcohols, and sulfur-containing solvents. Other examples of the water-soluble organic solvent include propylene carbonate and ethylene carbonate.

Examples of the polyhydric alcohols include: sugar alcohols such as ethylene glycol, diethylene glycol, propylene glycol, butylene glycol, triethylene glycol, 1,5-pentanediol, 1,2-hexanediol, 1,2,6-hexanetriol, glycerin, trimethylolpropane, and xylitol; and saccharides such as xylose, glucose, and galactose.

Examples of the derivatives of polyhydric alcohols include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and ethylene oxide adducts of diglycerin.

Examples of the nitrogen-containing solvents include pyrrolidone, N-methyl-2-pyrrolidone, cyclohexylpyrrolidone, and triethanolamine.

Examples of the alcohols include ethanol, isopropyl alcohol, butyl alcohol, and benzyl alcohol.

Examples of the sulfur-containing solvents include thiodiethanol, thiodiglycerol, sulfolane, and dimethyl sulfoxide.

Such water-soluble organic solvents may be used either alone or in combination of two or more thereof.

The content of the water-soluble organic solvent is preferably 1-60% by mass, more preferably 1-40% by mass, based on the water.

A surfactant is explained.

The inks may contain other surfactant. Examples of the other surfactants include anionic surfactants, nonionic surfactants, cationic surfactants, and amphoteric surfactants. Preferred are anionic surfactants and nonionic surfactants.

Examples of the anionic surfactants include alkylbenzenesulfonic acid salts, alklylphenylsulfonic acid salts, alkylnaphthalenesulfonic acid salts, higher fatty acid salts, sulfuric acid ester salts of higher fatty acid esters, sulfonic acid salts of higher fatty acid esters, sulfuric acid ester salts and sulfonic acid salts of higher alcohol ethers, (higher-alkyl) sulfosuccinic acid salts, polyoxyethylene alkyl ether carboxylic acid salts, polyoxyethylene alkyl ether sulfuric acid salts, alkylphosphoric acid salts, and polyoxyethylene alkyl ether phosphoric acid salts.

Preferred of these anionic surfactants are dodecylbenzenesulfonic acid salts, isopropylnaphthalenesulfonic acid salts, monobutylphenylphenolmonosulfonic acid salts, monobutylbiphenylsulfonic acid salts, monobutylbiphenylsulfonic acid salts, and dibutylphenylphenoldisulfonic acid salts.

Examples of the nonionic surfactants include polyoxyethylene alkyl ethers, polyoxyethylene alkylphenyl ethers, polyoxyethylene fatty acid esters, sorbitan fatty acid esters, polyoxyethylene-sorbitan fatty acid esters, polyoxyethylene-sorbitol fatty acid esters, glycerin fatty acid esters, polyoxyethylene-glycerin fatty acid esters, polyglycerin fatty acid esters, sucrose fatty acid esters, polyoxyethylene alkylamines, polyoxyethylene fatty acid amides, alkylalkanolamides, polyethylene glycol/polypropylene glycol block copolymers, and acetylene glycol.

Preferred of these nonionic surfactants are polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene-sorbitan fatty acid esters, fatty acid alkylolamides, polyethylene glycol/polypropylene glycol block copolymers, and acetylene glycol.

Other examples of the nonionic surfactants include: silicone surfactants such as polysiloxane oxyethylene adducts; fluorochemical surfactants such as perfluoroalkylcarboxylic acid salts, perfluoroalkylsulfonic acid salts, and oxyethylene perfluoroalkyl ethers; and biosurfactants such as spiculisporic acid, rhamnolipid, and lysolecithin.

Surfactants having a hydrophile-lipophile balance (HLB) in the range of, for example, 3-20 are desirable when the solubility thereof, etc. are taken into account.

The surfactant may be used either alone or in combination of two or more thereof.

The content of the surfactant in each ink is preferably 0.1-10% by mass, more preferably 0.1-5% by mass, even more preferably 0.2-3% by mass, based on the ink.

Other additives are explained.

The inks may contain other additives. Examples of the other additives include ink ejection improvers (e.g., polyethyleneimine, polyamines, polyvinylpyrrolidone, polyethylene glycol, ethyl cellulose, and carboxymethyl cellulose), conductivity/pH regulators (e.g., compounds of alkali metals, such as potassium hydroxide, sodium hydroxide, and lithium hydroxide), reactive diluent solvents, penetrants, pH buffers, antioxidants, fungicides, viscosity modifiers, conductive agents, chelating agents, ultraviolet absorbers, and infrared absorbers.

Suitable properties of the inks are explained.

The pH of each ink may be preferably in the range of 4-10, more preferably in the range of 5-9.

The ink pH values employed here were measured with a pH/conductivity meter (MPC 227, manufactured by Mettler Toledo Inc.) in an atmosphere having a temperature of 23±0.5° C. and a humidity of 55±5% R.H.

The electrical conductivity of each ink may be, for example, in the range of 0.01-0.5 S/m (preferably in the range of 0.01-0.25 S/m, more preferably in the range of 0.01-0.20 S/m).

Electrical conductivity is measured with MPC 227 (pH/conductivity meter; manufactured by Mettler Toledo Inc.).

The viscosity of each ink may be, for example, in the range of 1.5-30 mPa·s (preferably in the range of 1.5-20 mPa·s).

Viscosity is measured using TV-20 (manufactured by Toki Sangyo Co., Ltd.) as a measuring device under the conditions of a measuring temperature of 23° C. and a shear rate of 1,400 $s^{-1}$.

(Ink Set)

The ink set of the fourth exemplary embodiment of the invention includes water-based inks (hereinafter also referred to simply as "inks") of multiple colors different from each other, the inks each including a colorant, a polymer particle, water, and a water-soluble organic solvent. Each ink has a static surface tension of 28 mN/m or less and, when examined for dynamic surface tension by the maximum bubble pressure method, has a width of variations in dynamic surface tension for the period from 1 msec after to 1 sec after (hereinafter also referred to simply as "width of variations in dynamic surface tension") of 0.2-2.0 mN/m.

Moreover, in each ink, a contact angle to an impermeable recording medium is 10°-20°.

The difference in the width of variations in dynamic surface tension between the water-based inks of multiple colors is 0-1.0 mN/m.

In cases when an ink is ejected onto an impermeable recording medium, the ink droplets delivered to the recording medium do not infiltrate or are less apt to infiltrate into the recording medium and, hence, these ink droplets in the state of having a height remain on the surface of the recording medium even at the time when next ink droplets are delivered. Because of this, the ink is difficult to dry on the impermeable recording medium, and there are cases where a contact of a roller member (cooling roller, conveying roller, etc.) with the image-bearing surface immediately after image recording with the ink results in image peeling. Especially in cases when an image was recorded with inks of multiple colors, image peeling occurs considerably. Consequently, there is a desire for inks of multiple colors which themselves each have the property of quickly drying on impermeable recording media.

Although it is known to evaporate and dry inks by heating (thermal drying) in order to quickly dry the inks on impermeable recording media, this technique results in increases in energy consumption and equipment.

In the ink set of the fourth exemplary embodiment of the invention, not only each of the inks of multiple colors has been regulated so that the static surface tension and the width of variations in dynamic surface tension are within the ranges shown above but also the difference in the width of variations in dynamic surface tension between the inks of multiple colors is within the range shown above.

An ink having a static surface tension within the range and having a width of variations in dynamic surface tension within the range is an ink which has a reduced static surface tension and a reduced width of variations in dynamic surface tension. Namely, the feature indicates that this ink has the property of quickly spreading on and wetting impermeable recording media. Since this ink quickly spreads on and wets impermeable recording media, quick drying is rendered possible even in the case where the ink does not infiltrate or is less apt to infiltrate into the recording medium. In addition, in cases when inks of multiple colors which have that property are regulated so that the difference in the width of variations in dynamic surface tension between the inks is reduced to a value within the range, the inks of multiple colors have a reduced difference in drying rate. Namely, when an image is formed from these inks of multiple colors, all the inks dry similarly quickly. Consequently, even when the image-bearing surface comes into contact with a roller member immediately after image recording with the inks, the image is inhibited from peeling off.

Figure 3A:
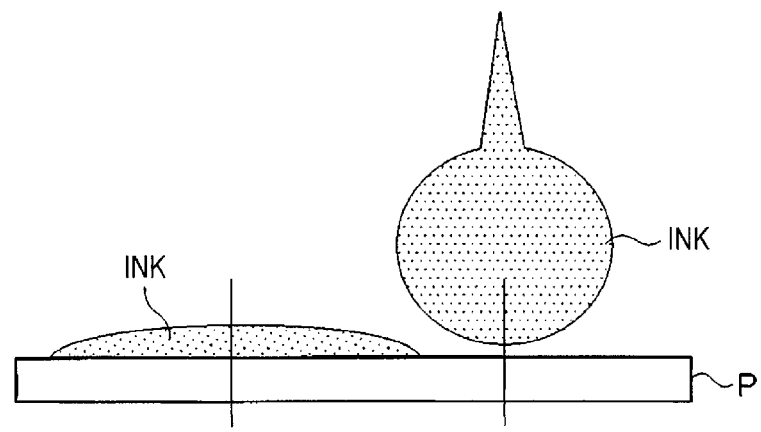
FIG. 3A is a schematic view that shows a state in which an ink droplet to be delivered next is just before reaching the recording medium.
Figure 3B:
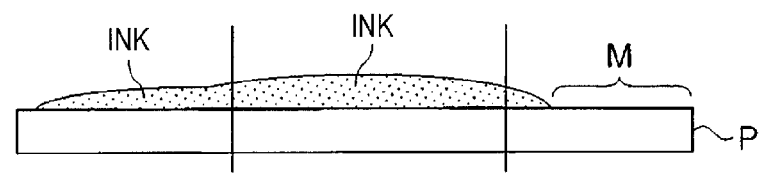
FIG. 3B is a schematic view that shows a state in which ink droplet delivery interference has occurred.
Figure 3C:
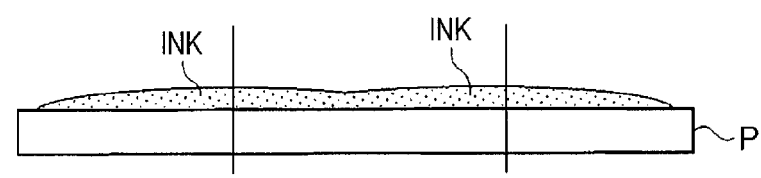
FIG. 3C is a schematic view that shows a state in which ink droplet delivery interference has not occurred.

Incidentally, in cases when an ink is ejected onto an impermeable recording medium, the ink droplet delivered to the recording medium does not infiltrate or is less apt to infiltrate into the recording medium as stated above. Consequently, the ink droplet in the state of having a height remains on the surface of the recording medium even at the time when a next ink droplet is delivered (see FIG. 3A). The ink droplet gradually spreads on the recording medium with the lapse of time. In cases when a next ink droplet is delivered to a position which adjoins the previously delivered droplet in that state, the late ink droplet, just before reading the recording medium, comes into contact with the remaining adjoining ink droplet and unites therewith. There are hence cases where the late ink droplet shifts from the delivery position (see FIG. 3B). Specifically, there are cases where the late ink droplet shifts from the delivery position toward the ink droplet which has been delivered previously (FIG. 3B), as compared with the case where the late ink droplet undergoes no delivery interference (FIG. 3C). This phenomenon is called delivery interference, and is causative of blind spots (for example, image defects whereby the base is visible in part of the image) due to the shifting of ink droplets from the delivery positions. The uniting of ink droplets due to shifting from the delivery positions enhances the graininess of the image. This enhancement of image graininess is severe when images are recorded with inks of multiple colors. Incidentally, P in FIG. 3 indicates a recording medium, "Ink" indicates an ink, and M indicates a shifting in delivery position due to ink droplet delivery interference.

For inhibiting the delivery interference, a technique is being employed in which a liquid for solidifying early ink droplets before late ink droplets are delivered is applied beforehand. However, such a two-liquid system has a complicated configuration and renders the control complicated.

In the ink set of the fourth exemplary embodiment of the invention, not only each of the inks of multiple colors has been regulated so that the static surface tension and the width of variations in dynamic surface tension are within the ranges shown above but also the inks of multiple colors have been regulated so that the contact angle between each ink and an impermeable recording medium is within the range shown above.

Figure 4A:
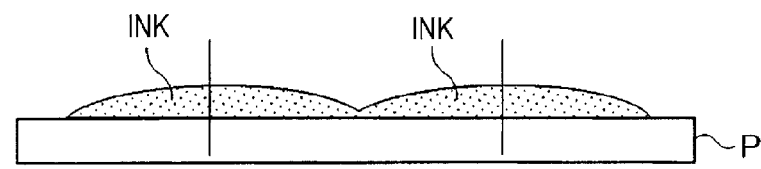
FIG. 4A is a schematic view that shows a state in which a late ink droplet has been just delivered.
Figure 4B:
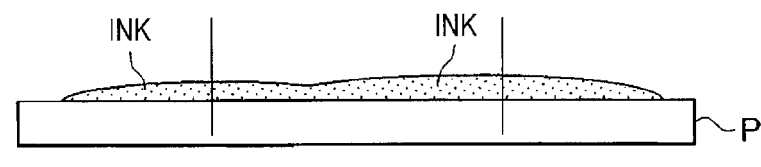
FIG. 4B is a schematic view that shows a state in which after the late ink droplet was delivered, the early ink droplet unites with the late ink droplet.

As stated above, an ink having a static surface tension within the range and having a width of variations in dynamic surface tension within the range is an ink which has the property of quickly spreading on and wetting impermeable recording media. Because of this, at the time when an ink droplet which is being delivered next comes into contact, just before reaching the recording medium, with a previously delivered ink droplet which remains at an adjoining position (see FIG. 4A), the ink droplet which has been delivered previously is in the state of having spread on the recording medium. In addition, the ink droplet which has spread is in the state of drying quickly and having increased viscosity. Even when an ink droplet which is being delivered next comes into contact, just before reaching the recording medium, with the previously delivered ink droplet, which remains in that state at an adjoining position, and unites therewith, the uniting force is weak (FIG. 4B). In FIG. 4, P indicates a recording medium and "Ink" indicates an ink.

In addition, by reducing the contact angle between each of the inks of multiple colors and the impermeable recording medium to a value within that range, the ink droplet which has been delivered previously is rendered apt to quickly spread while wetting the recording medium, resulting in quick drying and increased viscosity. Thus, delivery interference is further inhibited.

Consequently, in cases when an image is recorded with such inks of multiple colors, the occurrence of blind spots is inhibited and image graininess is reduced.

As described above, the ink set of the fourth exemplary embodiment of the invention, when the inks of multiple colors are applied to an impermeable recording medium, is effective in inhibiting the image formed from the inks from peeling off or having graininess. It is, however, noted that those reasons for the inhibition of image peeling and image graininess are a presumption and should not be restrictively construed at all.

Examples of the impermeable recording medium include coated paper and resin films. Specifically, the term "impermeable recording medium" means a recording medium in which, in an examination with a dynamic scanning liquid absorption meter, the maximum ink absorption in a contact time of 500 ms is 15 mL/m$^2$ or less.

In the ink set of the fourth exemplary embodiment of the invention, the static surface tension of each ink is 28 mN/m or less, and is preferably 21-28 mN/m from the standpoint of ejection stability.

The values of static surface tension were measured in an atmosphere of 23° C. and 55% RH using Wilhelmy surface tension balance CBVP-Z (manufactured by Kyowa Interface Science Co., Ltd.).

The width of variations in dynamic surface tension of each ink is 0.2-2.0 mN/m. From the standpoints of inhibiting image peeling and reducing image graininess, the width of variations in dynamic surface tension thereof is preferably 0.2-1.8 mN/m, more preferably 0.2-1.5 mN/m. Incidentally, the width of variations in dynamic surface tension is the difference between the value of dynamic surface tension measured at 1 msec after and the value of dynamic surface tension measured at 1 sec after.

From the standpoints of inhibiting image peeling and reducing image graininess, the dynamic surface tension of each ink as measured at 1 msec after is preferably 32 mN/m or less, more preferably 21-30 mN/m, even more preferably 22-28 mN/m.

Meanwhile, the dynamic surface tension of each ink as measured at 1 sec after is preferably 30 mN/m or less, more preferably 21-28 mN/m, even more preferably 22-28 mN/m, from the standpoints of inhibiting image peeling and reducing image graininess.

The difference in the width of variations in dynamic surface tension between the inks is 0-1.0 mN/m. From the standpoints of inhibiting image peeling and reducing image graininess, the difference therein is preferably 0-0.9 mN/m, more preferably 0-0.5 mN/m. Incidentally, the difference in the width of variations in dynamic surface tension is given in terms of absolute value.

The values of dynamic surface tension were measured in an atmosphere of 23° C. and 55% RH using dynamic surface tensiometer MPT C (manufactured by Lauda GmbH), which is based on the maximum bubble pressure method.

Incidentally, the value of dynamic surface tension as measured at 1 msec after is the value of dynamic surface tension measured at the time when 1 msec has passed since a new interface was formed at the end of the capillary and when a maximum bubble pressure is reached. It is, however, noted that in dynamic surface tensiometers based on the maximum bubble pressure method in which a displayed limit of measurement is a dynamic surface tension measured at 1 msec after, there are cases where this value is expressed as dynamic surface tension measured at 0 msec after. In this case, the value of dynamic surface tension measured at 0 msec after is taken as a value of dynamic surface tension measured at 1 msec after.

Meanwhile, the value of dynamic surface tension as measured at 1 sec after is the value of dynamic surface tension measured at the time when 1 sec has passed since a new interface was formed at the end of the capillary and when a maximum bubble pressure is reached. It is, however, noted that in dynamic surface tensiometers based on the maximum bubble pressure method in which a limit of measurement is a dynamic surface tension measured at less than 1 sec after, the value of dynamic surface tension measured at the limit of measurement is taken as a value of dynamic surface tension measured at 1 sec after. This is because so long as the value of dynamic surface tension is one measured at the limit of measurement, it is possible to determine that the dynamic surface tension was in a stable region.

Each ink has a contact angle (contact angle with an impermeable recording medium) of 10°-20°. From the standpoints of inhibiting image peeling and reducing image graininess, the contact angle thereof is preferably 10°-18°, more preferably 10°-17°.

The difference in contact angle (contact angle with an impermeable recording medium) between the inks is preferably 0°-10°, more preferably 0°-5°, from the standpoints of inhibiting image peeling and reducing image graininess.

The values of contact angle (contact angle with an impermeable recording medium) were measured using contact angle meter "trade name CA-X (manufactured by Kyowa Interface Science Co., Ltd.)" under the conditions of 23° C. and 55% RH at the time when 5 seconds had passed since 3 μL of the ink had been dropped onto the impermeable recording medium.

From the standpoint of regulating each ink so that the static surface tension, the width of variations in dynamic surface tension, the difference in the width of variations in dynamic surface tension, and the dynamic surface tension as measured at 1 msec after or at 1 sec after, and the contact angle are within the ranges shown above, it is desirable, for example, that each ink should contain a surfactant in addition to a colorant, a polymer particle, water, and a water-soluble organic solvent. Namely, it is desirable that the static surface tension, the width of variations in dynamic surface tension, the difference in the width of variations in dynamic surface tension, and the dynamic surface tension as measured at 1 msec after or at 1 sec after, and the contact angle should be regulated by changing the kind of surfactant and the amount thereof.

Examples of the surfactant include surfactants having an HLB (hydrophile-lipophile balance) of 14 or less. For example, by regulating the amount of a surfactant having an HLB of 14 or less, the ink is rendered easy to regulate so as to have a desired static surface tension. Furthermore, in cases when use is made of a plurality of surfactants which each have an HLB of 14 or less but which differ in HLB, it is easy to regulate the ink so as to have a desired dynamic surface tension. Specifically, in cases when, for example, a surfactant having an HLB of 11-14 and a surfactant having an HLB of 4 or higher but less than 11 are used, it is easy to regulate the ink so as to have a desired dynamic surface tension.

Incidentally, HLB (hydrophile-lipophile balance) is defined by the following equation (Griffin method).

$$HLB=20\times[(\text{total formula weight of the hydrophilic moieties})/(\text{molecular weight})]$$

Examples of such surfactants include at least one member selected from the group consisting of ethylene oxide adducts of acetylene glycol and polyether-modified silicones.

The ethylene oxide adducts of acetylene glycol are, for example, compounds obtained by causing ethylene oxide to add to at least one of the hydroxyl groups of acetylene glycol and having the structure —O—$(CH_2CH_2O)_n$—H (n represents an integer of, for example, 1-30).

Examples of commercial products of the ethylene oxide adducts of acetylene glycol (the numerals within the parentheses are HLB values given in the catalogs) include Olfin E1004 (7-9), Olfin E1010 (13-14), Olfin EXP. 4001 (8-11), Olfin EXP. 4123 (11-14), Olfin EXP. 4300 (10-13), Surfynol 10411 (4), Surfynol 420 (4), Surfynol 440 (4), and Dynol 604 (8) [all manufactured by Nissin Chemical Industry Co., Ltd.].

The content of such an ethylene oxide adduct of acetylene glycol is, for example, desirably 0.01-10% by mass, preferably 0.1-5% by mass, based on the ink.

The polyether-modified silicones are, for example, compounds formed by bonding a polyether group, as a grafted pendant chain or as a block, to a silicone chain (polysiloxane backbone). Examples of the polyether group include a polyoxyethylene group and a polyoxypropylene group. The polyether group may be, for example, a polyoxyalkylene group composed of oxyethylene groups and oxypropylene groups which have combined together by block or random addition.

Examples of commercial products of the polyether-modified silicones (the numerals within the parentheses are HLB values given in the catalogs) include Silface SAG002 (12), Silface SAG503A (11), and Silface SAG005 (7) [all manufactured by Nissin Chemical Industry Co., Ltd.].

The content of such a polyether-modified silicone is, for example, desirably 0.01-5% by mass, preferably 0.05-1% by mass, based on the ink.

In the ink set according to the fourth exemplary embodiment, the inks of multiple colors are configured of inks of at least two colors selected, for example, from a black ink, a cyan ink, a magenta ink, a yellow ink, and inks of intermediate colors as other colors. The ink set may be configured of inks of multiple colors excluding black (for example, inks of at least two colors selected from a cyan ink, a magenta ink, a yellow ink, and inks of intermediate colors as other colors). It is preferable that this ink set should be configured of inks of three colors, i.e., a cyan ink, a magenta ink, and a yellow ink.

Next, the composition and properties of each ink of the ink set of the fourth exemplary embodiment of the invention are explained in detail.

The inks of the ink set respectively contain colorants which differ in color from each other. Each ink contains a polymer particle, water, and a water-soluble organic solvent in addition to the colorant.

The colorants are explained.

Examples of the colorants include pigments. Examples of the pigments include organic pigments and inorganic pigments.

Specific examples of black pigments include: Raven 7000, Raven 5750, Raven 5250, Raven 5000 ULTRAII, Raven 3500, Raven 2000, Raven 1500, Raven 1250, Raven 1200, Raven 1190 ULTRAII, Raven 1170, Raven 1255, Raven 1080, and Raven 1060 (all manufactured by Columbian Carbon Ltd.); Regal 400R, Regal 330R, Regal 660R, Mogul L, Black Pearls L, Monarch 700, Monarch 800, Monarch 880, Monarch 900, Monarch 1000, Monarch 1100, Monarch 1300, and Monarch 1400 (all manufactured by Cabot Corp.); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (all manufactured by Degussa AG); and No. 25, No. 33, No. 40, No. 47, No. 52, No. 900, No. 2300, MCF-88, MA600, MA7, MA8, and MA100 (all manufactured by Mitsubishi Chemical Corp.). However, usable black pigments are not limited to these examples.

Specific examples of cyan pigments include C.I. Pigment Blues 1, 2, 3, 15, 15:1, 15:2, 15:3, 15:4, 16, 22, and 60. However, usable cyan pigments are not limited to these examples.

Specific examples of magenta pigments include C.I. Pigment Reds 5, 7, 12, 48, 48:1, 57, 112, 122, 123, 146, 168, 177, 184, and 202 and C.I. Pigment Violet 19. However, usable magenta pigments are not limited to these examples.

Specific examples of yellow pigments include C.I. Pigment Yellows 1, 2, 3, 12, 13, 14, 16, 17, 73, 74, 75, 83, 93, 95, 97, 98, 114, 128, 129, 138, 151, 154, and 180. However, usable yellow pigments are not limited to these examples.

In the case where a pigment is used as the colorant, it is preferred to use a pigment dispersant in combination therewith. Examples of the pigment dispersant to be used include polymeric dispersants, anionic surfactants, cationic surfactants, amphoteric surfactants, and nonionic surfactants.

A suitable polymeric dispersant is a polymer which has a hydrophilic structure part and a hydrophobic structure part. As the polymer having a hydrophilic structure part and a hydrophobic structure part, use may be made of, for example, a condensation polymer and an addition polymer. Examples of the condensation polymer include known polyester-based dispersants. Examples of the addition polymer include addition polymers of monomers having an $\alpha,\beta$-ethylenically unsaturated group. By copolymerizing a monomer which has an $\alpha,\beta$-ethylenically unsaturated group and has a hydrophilic group with a monomer which has an $\alpha,\beta$-ethylenically unsaturated group and has a hydrophobic group, a desired polymeric dispersant may be obtained. Use may also be made of a homopolymer of a monomer which has an $\alpha,\beta$-ethylenically unsaturated group and has a hydrophilic group.

Examples of the monomers having an $\alpha,\beta$-ethylenically unsaturated group and having a hydrophilic group include monomers having a carboxyl group, sulfo group, hydroxyl group, phosphate group, etc., such as acrylic acid, methacrylic acid, crotonic acid, itaconic acid, itaconic acid monoesters, maleic acid, maleic acid monoesters, fumaric acid, fumaric acid monoesters, vinylsulfonic acid, styrenesulfonic acid, sulfonated vinylnapthalenes, vinyl alcohol, acrylamide, methacryloxyethyl phosphate, bismethacryloxyethyl phosphate, methacryloxyethyl phenyl acid phosphate, ethylene glycol dimethacrylate, and diethylene glycol dimethacrylate.

Examples of the monomers having an $\alpha,\beta$-ethylenically unsaturated group and having a hydrophobic group include styrene, styrene derivatives such as $\alpha$-methylstyrene and vinyltoluene, vinylcyclohexane, vinylnaphthalene, vinylnaphthalene derivatives, acrylic acid alkyl esters, methacrylic acid alkyl esters, the phenyl ester of methacrylic acid, methacrylic acid cycloalkyl esters, crotonic acid alkyl esters, itaconic acid dialkyl esters, and maleic acid dialkyl esters.

Examples of the copolymer which is a preferred polymeric dispersant include styrene/styrenesulfonic acid copolymers, styrene/maleic acid copolymers, styrene/methacrylic acid copolymers, styrene/acrylic acid copolymers, vinylnaphthalene/maleic acid copolymers, vinylnaphthalene/methacrylic acid copolymers, vinylnaphthalene/acrylic acid copolymers, alkyl acrylate/acrylic acid copolymers, alkyl methacrylate/methacrylic acid copolymers, styrene/alkyl methacrylate/methacrylic acid copolymers, styrene/alkyl acrylate/acrylic acid copolymers, styrene/phenyl methacrylate/methacrylic acid copolymers, and styrene/cyclohexyl methacrylate/methacrylic acid copolymers. Monomers having a polyoxyethylene group or a hydroxyl group may be copolymerized with these polymers.

It is desirable that the polymeric dispersant should have a weight-average molecular weight of, for example, 2,000-50,000.

Such polymeric dispersants may be used either alone or in combination of two or more thereof. The content of the polymeric dispersant cannot be unconditionally shown since the content thereof varies considerably depending on the pigment. It is, however, desirable that the content thereof should be 0.1-100% by mass based on the pigment.

Examples of the pigments further include pigments which self-disperse in water (hereinafter referred to as self-dispersion type pigments).

The term self-dispersion type pigment means a pigment which has water-soluble groups on the surface thereof and which disperses in water even in the absence of a polymeric dispersant. The self-dispersion type pigment is obtained, for example, by subjecting a pigment to a surface modification treatment such as an acid/base treatment, coupling agent treatment, polymer grafting treatment, plasma treatment, or oxidation/reduction treatment.

Other than the pigment obtained by subjecting a pigment to a surface modification treatment, examples of the self-dispersion type pigments include commercial self-dispersion type pigments such as: Cab-o-jet-200, Cab-o-jet-300, Cab-o-jet-400, IJX-157, IJX-253, IJX-266, IJX-273, IJX-444, JIX-55, Cab-o-jet-250C, Cab-o-jet-260M, Cab-o-jet-270Y, Cab-o-jet-450C, Cab-o-jet-465M, Cab-o-jet-470Y, and Cab-o-jet-480M, all manufactured by Cabot Corp.; and Microjet Black CW-1 and CW-2, manufactured by Orient Chemical Industries, Ltd.

It is preferable that the self-dispersion type pigments should be pigments which have at least a sulfonic acid, sulfonic acid salt, carboxylic acid, or carboxylic acid salt as functional groups on the surfaces thereof. More preferred is a pigment which has at least a carboxylic acid or a carboxylic acid salt as functional groups on the surface thereof.

Examples of the pigments further include pigments coated with a resin. These pigments are called microcapsule pigments, and there are commercial microcapsule pigments manufactured by DIC Corp., Toyo Ink Mfg. Co., Ltd., etc. Other than commercial microcapsule pigments, a microcapsule pigment produced in accordance with a purpose may be used.

Examples of the pigments furthermore include a resin dispersion type pigment obtained by physically adsorbing or chemically bonding a high-molecular compound to a pigment.

Other than black pigments and pigments of the three primary colors of cyan, magenta, and yellow, examples of the pigments include pigments of specific colors of red, green, blue, brown, white, etc., metallic-luster pigments of golden, silver, or other colors, colorless or light-colored extender pigments, and plastic pigments.

Examples of the pigments still further include particles obtained by fixing a dye or a pigment to the surface of silica, alumina, polymer beads, or the like as cores, lake pigments obtained by insolubilizing dyes, colored emulsions, and colored latexes.

Other than pigments, examples of the colorants include: dyes such as hydrophilic anionic dyes, direct dyes, cationic dyes, reactive dyes, polymeric dyes, and oil-soluble dyes; wax powders, resin powders, and emulsions colored with dyes; and fluorescent dyes and fluorescent pigments.

The colorants may each have a volume-average particle diameter of, for example, 10-1,000 nm.

The term "volume-average particle diameter of a colorant" means the particle diameter of the colorant itself or, in the case of a colorant to which an additive such as a dispersant is adherent, means the diameter of the particles including the adherent additive. The volume-average particle diameter is determined using particle size analyzer Microtrac UPA-UT151 (manufactured by Microtrac Inc.). In the measurement, an ink diluted 1,000 times was introduced into the measuring cell and examined. As values to be inputted for the determination, the viscosity of the diluted ink was used as the viscosity value and the refractive index of the colorant was used as the refractive index of particles.

The content (concentration) of the colorant in each ink is, for example, preferably 1-25% by mass, more preferably 2-20% by mass, based on the ink.

The polymer particle is explained.

The polymer particle is a component which enhances the fixability of ink images to impermeable recording media.

Examples of the polymer particles include particles (latex particles) of styrene/acrylic acid copolymers, styrene/acrylic acid/sodium acrylate copolymers, styrene/butadiene copolymers, polystyrene, acrylonitrile/butadiene copolymers, acrylic acid ester copolymers, polyurethanes, silicone/acrylic acid copolymers, acrylic-modified fluororesins, etc. Examples of the polymer particles further include core/shell type polymer particles in which the central part and peripheral part of each particle differ in composition.

The polymer particle may be ones which have been dispersed in the ink using an emulsifying agent, or may be ones which have been dispersed in the ink without using an emulsifying agent. Examples of the emulsifying agent include surfactants and polymers having a hydrophilic group such as a sulfo group or a carboxyl group (e.g., polymers onto which a hydrophilic group has been grafted and polymers obtained from a monomer having hydrophilicity and a monomer having a hydrophobic portion).

The volume-average particle diameter of the polymer particle is preferably 10-300 nm, more preferably 10-200 nm, from the standpoints of the glossiness and abrasion resistance of images.

The volume-average particle diameter of polymer particle is determined using particle size analyzer Microtrac UPA-UT151 (manufactured by Microtrac Inc.). In the measurement, an ink diluted 1,000 times was introduced into the measuring cell and examined. As values to be inputted for the determination, the viscosity of the diluted ink was used as the viscosity value and the refractive index of the polymer was used as the refractive index of particles.

The polymer particle has a glass transition temperature of preferably −20 to 80° C., more preferably −10 to 60° C., from the standpoint of the abrasion resistance of images.

The glass transition temperature of the polymer particle is determined from a DSC curve obtained by differential scanning calorimetry (DSC). More specifically, the glass transition temperature thereof is determined in accordance with "Extrapolated Glass Transition Initiation Temperature" described under Method for Determining Glass Transition Temperature in JIS K7121-1987 "Method for Determining Transition Temperatures of Plastics".

The content of the polymer particle in each ink is, for example, preferably 0.1-10% by mass, more preferably 0.5-5% by mass, based on the ink.

The water is explained.

Suitable examples of the water include ion-exchanged water, ultrapure water, distilled water, and water purified by ultrafiltration, especially from the standpoint of preventing inclusion of impurities or proliferation of microorganisms.

The content of water in each ink is, for example, preferably 10-95% by mass, more preferably 30-90% by mass, based on the ink.

The water-soluble organic solvent is explained.

Examples of the water-soluble organic solvent include polyhydric alcohols, derivatives of polyhydric alcohols, nitrogen-containing solvents, alcohols, and sulfur-containing solvents. Other examples of the water-soluble organic solvent include propylene carbonate and ethylene carbonate.

Examples of the polyhydric alcohols include: sugar alcohols such as ethylene glycol, diethylene glycol, propylene glycol, butylene glycol, triethylene glycol, 1,5-pentanediol, 1,2-hexanediol, 1,2,6-hexanetriol, glycerin, trimethylolpropane, and xylitol; and saccharides such as xylose, glucose, and galactose.

Examples of the derivatives of polyhydric alcohols include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and ethylene oxide adducts of diglycerin.

Examples of the nitrogen-containing solvents include pyrrolidone, N-methyl-2-pyrrolidone, cyclohexylpyrrolidone, and triethanolamine.

Examples of the alcohols include ethanol, isopropyl alcohol, butyl alcohol, and benzyl alcohol.

Examples of the sulfur-containing solvents include thiodiethanol, thiodiglycerol, sulfolane, and dimethyl sulfoxide.

Such water-soluble organic solvents may be used either alone or in combination of two or more thereof.

The content of the water-soluble organic solvent is preferably 1-60% by mass, more preferably 1-40% by mass, based on the water.

A surfactant is explained.

The inks may contain other surfactant. Examples of the other surfactants include anionic surfactants, nonionic surfactants, cationic surfactants, and amphoteric surfactants. Preferred are anionic surfactants and nonionic surfactants.

Examples of the anionic surfactants include alkylbenzenesulfonic acid salts, alklylphenylsulfonic acid salts, alkylnaphthalenesulfonic acid salts, higher fatty acid salts, sulfuric acid ester salts of higher fatty acid esters, sulfonic acid salts of higher fatty acid esters, sulfuric acid ester salts and sulfonic acid salts of higher alcohol ethers, (higher-alkyl)sulfosuccinic acid salts, polyoxyethylene alkyl ether carboxylic acid salts, polyoxyethylene alkyl ether sulfuric acid salts, alkylphosphoric acid salts, and polyoxyethylene alkyl ether phosphoric acid salts.

Preferred of these anionic surfactants are dodecylbenzenesulfonic acid salts, isopropylnaphthalenesulfonic acid salts, monobutylphenylphenolmonosulfonic acid salts, monobutylbiphenylsulfonic acid salts, monobutylbiphenylsulfonic acid salts, and dibutylphenylphenoldisulfonic acid salts.

Examples of the nonionic surfactants include polyoxyethylene alkyl ethers, polyoxyethylene alkylphenyl ethers, polyoxyethylene fatty acid esters, sorbitan fatty acid esters, polyoxyethylene-sorbitan fatty acid esters, polyoxyethylene-sorbitol fatty acid esters, glycerin fatty acid esters, polyoxyethylene-glycerin fatty acid esters, polyglycerin fatty acid esters, sucrose fatty acid esters, polyoxyethylene alkylamines, polyoxyethylene fatty acid amides, alkylalkanolamides, polyethylene glycol/polypropylene glycol block copolymers, and acetylene glycol.

Preferred of these nonionic surfactants are polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene-sorbitan fatty acid esters, fatty acid alkylolamides, polyethylene glycol/polypropylene glycol block copolymers, and acetylene glycol.

Other examples of the nonionic surfactants include: silicone surfactants such as polysiloxane oxyethylene adducts;

fluorochemical surfactants such as perfluoroalkylcarboxylic acid salts, perfluoroalkylsulfonic acid salts, and oxyethylene perfluoroalkyl ethers; and biosurfactants such as spiculisporic acid, rhamnolipid, and lysolecithin.

Surfactants having a hydrophile-lipophile balance (HLB) in the range of, for example, 3-20 are desirable when the solubility thereof, etc. are taken into account.

The surfactant may be used either alone or in combination of two or more thereof.

The content of the surfactant in each ink is preferably 0.1-10% by mass, more preferably 0.1-5% by mass, even more preferably 0.2-3% by mass, based on the ink.

Other additives are explained.

The inks may contain other additives. Examples of the other additives include ink ejection improvers (e.g., polyethyleneimine, polyamines, polyvinylpyrrolidone, polyethylene glycol, ethyl cellulose, and carboxymethyl cellulose), conductivity/pH regulators (e.g., compounds of alkali metals, such as potassium hydroxide, sodium hydroxide, and lithium hydroxide), reactive diluent solvents, penetrants, pH buffers, antioxidants, fungicides, viscosity modifiers, conductive agents, chelating agents, ultraviolet absorbers, and infrared absorbers.

Suitable properties of the inks are explained.

The pH of each ink may be preferably in the range of 4-10, more preferably in the range of 5-9.

The ink pH values employed here were measured with a pH/conductivity meter (MPC 227, manufactured by Mettler Toledo Inc.) in an atmosphere having a temperature of 23±0.5° C. and a humidity of 55±5% R.H.

The electrical conductivity of each ink may be, for example, in the range of 0.01-0.5 S/m (preferably in the range of 0.01-0.25 S/m, more preferably in the range of 0.01-0.20 S/m).

Electrical conductivity is measured with MPC 227 (pH/conductivity meter; manufactured by Mettler Toledo Inc.).

The viscosity of each ink may be, for example, in the range of 1.5-30 mPa·s (preferably in the range of 1.5-20 mPa·s).

Viscosity is measured using TV-20 (manufactured by Told. Sangyo Co., Ltd.) as a measuring device under the conditions of a measuring temperature of 23° C. and a shear rate of 1,400 s$^{-1}$.

(Recording Device/Recording Method)

The recording device of the first exemplary embodiment is a recording device equipped with one or more ejection heads which eject either the water-based ink of the first exemplary embodiment or the water-based inks of the ink set of the first exemplary embodiment onto a recording medium. According to the recording device of the first exemplary embodiment, a recording method is rendered possible, the recording method including an ejection step in which either the water-based ink of the invention or the water-based inks of the ink set of the invention are ejected onto an impermeable recording medium.

The recording device of the first exemplary embodiment may be further equipped with a dryer for drying the water-based ink(s) ejected onto the recording medium. This recording device further equipped with a dryer enables the recording method to further include a drying step for drying the water-based ink(s) ejected onto the recording medium. The water-based inks ejected onto the recording medium are dried by the dryer (in the drying step), thereby rendering high-speed recording possible.

It is desirable that the temperature for drying by the dryer (in the drying step) should be 35-200° C. (preferably 40-150° C.) in terms of the surface temperature of the recording medium.

In cases when the temperature is 35° C. or higher, the water-based inks can be quickly dried. Meanwhile, by regulating the temperature to 200° C. or lower, quick ink drying is rendered possible while inhibiting recording medium scorching, an increase in device cost, and an increase in power consumption.

Incidentally, the surface temperature of a recording medium is the value measured just after drying in the following manner. First, a radiation thermometer is disposed at a position within the recording device which is located at a distance of 0.5 m from the dryer in terms of recording medium conveying distance. The temperature of a nonimage area (unprinted white portion) of the recording medium is measured with the radiation thermometer, and this measured temperature is taken as the surface temperature of the recording medium.

The recording device of the first exemplary embodiment may be equipped with an ink cartridge in which the water-based ink of the invention is retained so as to be suitable for attachment to and detachment from the recording device.

Furthermore, the recording device of the first exemplary embodiment may be equipped with an ink cartridge set in which the water-based inks of the ink set of the invention are retained in the cartridges so as to be suitable for attachment to and detachment from the recording device.

The recording device of the second exemplary embodiment of the invention is a recording device equipped with ejection heads which eject the water-based inks of the ink set of the third or fourth exemplary embodiment of the invention onto an impermeable recording medium. According to the recording device of the second exemplary embodiment of the invention, a recording method is rendered possible, the recording method including an ejection step in which the water-based inks of the ink set are ejected onto an impermeable recording medium.

The recording device of the second exemplary embodiment of the invention may be further equipped with a dryer for drying the water-based inks which have been ejected onto the impermeable recording medium. This recording device further equipped with the dryer enables the recording method to further include a drying step in which the water-based inks that have been ejected onto the impermeable recording medium are dried. The water-based inks ejected onto the impermeable recording medium are dried by the dryer (in the drying step), thereby rendering high-speed recording possible.

The recording device of the second exemplary embodiment of the invention may be equipped with an ink cartridge set in which the water-based inks of the ink set of the invention are retained in the cartridges so as to be suitable for attachment to and detachment from the recording device.

The recording device of the third exemplary embodiment of the invention is a recording device equipped with an ejection head which ejects the ink of the second exemplary embodiment of the invention onto a pressure-sensitive adhesive layer of press-bonding paper for ink-jet recording. According to the recording device of the third exemplary embodiment of the invention, a recording method is rendered possible, the recording method including an ejection step in which the ink of the second exemplary embodiment of the invention is ejected onto a pressure-sensitive adhesive layer of press-bonding paper for ink-jet recording.

The recording device of the third exemplary embodiment of the invention may be further equipped with a dryer for drying the ink ejected onto the pressure-sensitive adhesive layer. This recording device further equipped with a dryer enables the recording method to further include a drying step in which the ink that has been ejected onto the pressure-sensitive adhesive layer is dried.

The ink ejected onto the pressure-sensitive adhesive layer is dried by the dryer (in the drying step), thereby rendering high-speed recording possible.

The recording device of the third exemplary embodiment of the invention may be equipped with an ink cartridge (ink cartridge of the embodiment) in which the ink of the invention is retained so as to be suitable for attachment to and detachment from the recording device.

Embodiments of the recording device and recording method of the exemplary embodiment of the invention are explained below by reference to the drawing.

FIG. 1 is a diagrammatic view which illustrates the configuration of a recording device according to the first or second exemplary embodiment of the invention.

As shown in FIG. 1, the recording device 10 according to the first or second exemplary embodiment is a recording device equipped with ejection heads 122 (or with an ejection device 121 having ejection heads 122) which eject water-based inks (hereinafter also referred to as "inks") onto a recording medium P. With the recording device 10 according to the first or second exemplary embodiment, a recording method including an ejection step for ejecting inks onto a recording medium P is rendered possible. Thus, an image formed from the inks is recorded on the recording medium P.

In addition, in the recording device 10 according to the second exemplary embodiment, the recording medium P is an impermeable recording medium P.

Specifically, the recording device 10 according to the first or second exemplary embodiment is equipped with an image-recording unit 12 in which an image is recorded, for example, on continuous paper as the recording medium P (hereinafter, the paper is referred to also as "continuous paper P").

The recording device 10 is equipped with a pretreatment unit 14 in which the continuous paper P to be fed to the image-recording unit 12 is retained and with a buffer unit 16 which regulates the conveying rate, etc. of the continuous paper P being fed from the pretreatment unit 14 to the image-recording unit 12. The buffer unit 16 has been disposed between the image-recording unit 12 and the pretreatment unit 14.

The recording device 10 is equipped, for example, with a post-treatment unit 18 for retaining therein the continuous paper P discharged from the image-recording unit 12 and with a buffer unit 20 which regulates the conveying rate, etc. of the continuous paper P being discharged from the image-recording unit 12 to the post-treatment unit 18. The buffer unit 20 has been disposed between the image-recording unit 12 and the post-treatment unit 18.

The recording device 10 is equipped with a cooling unit 22 which has been disposed between the image-recording unit 12 and the buffer unit 20 and which cools the continuous paper P that has been carried out from the image-recording unit 12.

The image-recording unit 12 is equipped, for example, with roll members (reference numerals are omitted) which guide the continuous paper P along a conveying passage 124 of the continuous paper P and with an ejection device 121 which ejects inks (ink droplets) onto the continuous paper P being conveyed along the conveying passage 124 of the continuous paper P and which thereby records an image on the continuous paper P.

The ejection device 121 is equipped with ejection heads 122 which eject inks onto the continuous paper P. The ejection heads 122 are each, for example, a long recording head which has an effective recording area (area over which ink ejection nozzles have been disposed) not shorter than the width of the continuous paper P (i.e., the dimension thereof along a direction that crosses (for example, is perpendicular to) the conveying direction of the continuous paper P).

The ejection heads 122 are not limited to the type shown above, and may be ejection heads that are shorter than the width of the continuous paper P and are of the type in which each head ejects the ink while travelling in the width direction of the continuous paper P (so-called carriage type).

The ejection heads 122 may be of the so-called thermal type in which ink droplets are ejected by heat, or may be the so-called piezoelectric type in which ink droplets are ejected by pressure. Known types are applicable.

The ejection heads 122 include, for example, an ejection head 122K which ejects an ink onto the continuous paper P to record an image of a K (black) color thereon, an ejection head 122Y which likewise records an image of a Y (yellow) color, an ejection head 122M which likewise records an image of an M (magenta) color, and an ejection head 122C which likewise records an image of a C (cyan) color. The ejection head 122K, ejection head 122Y, ejection head 122M, and ejection head 122C have been arranged in this order from the upstream to the downstream side along the conveying direction of the continuous paper P (hereinafter often referred to simply as "paper conveying direction") so that these ejection heads face the continuous paper P. Incidentally, in the case where the ejection heads for K, Y, M, and C are inclusively referred to, the affixed symbols K, Y, M, and C are omitted.

The ejection heads 122K, 122Y, 122M, and 122C are connected respectively to ink cartridges 123K, 123Y, 123M, and 123C of respective colors through feed tubes (not shown), the ink cartridges being attached to and detached from the recording device 10. From the ink cartridges 123, the inks of respective colors are fed to the respective ejection heads 122.

The ejection heads 122 are not limited to the mode in which four ejection heads 122 respectively corresponding to the four colors are disposed. Use may be made of a mode in which more than four ejection heads 122 respectively corresponding to more than four colors including one or more intermediate colors besides the four colors have been disposed according to purposes.

The ejection heads 122 may include, for example, either an ejection head 122 for low resolution which ejects an ink so that the amount of each ink droplet is in the range of 1-15 pL (e.g., an ejection head for 600 dpi) or an ejection head 122 for high resolution which ejects an ink so that the amount of each ink droplet is below 10 pL (e.g., an ejection head for 1,200 dpi). The ejection device 121 may be equipped with both ejection heads 122 for low resolution and ejection heads 122 for high resolution. The amount of an ink droplet for an ejection head 122 is given in terms of the range of the amount of the largest ink droplet. Furthermore, dpi means "dot per inch".

The ejection device 121 includes a drying drum 126 (an example of dryers) disposed downstream from the ejection heads 122 along the paper conveying direction. For example, the drying drum 126 has been configured so that the back surface of the continuous paper P is wound and stretched on the drying drum 126, and the drying drum 126 dries the image (inks) on the continuous paper P while being rotated by the contact with the continuous paper P which is being conveyed.

A heating element (e.g., a halogen lamp heater, not shown) has been built into the drying drum 126. The drying drum 126 dries the image (inks) formed on the continuous paper P, by means of the heating by the heating element.

At the periphery of the drying drum 126, a hot-air blower 128 (an example of dryers) for drying the image (inks) formed on the continuous paper P has been disposed. The image (inks) formed on the continuous paper P wound and stretched on the drying drum 126 is dried with the hot air supplied from the hot-air blower 128.

In the ejection device 121, another drying device for drying the image (inks) formed on the continuous paper P, such as a near-infrared heater (not shown) or a laser irradiator, may have been disposed downstream from the ejection heads 122 along the paper conveying direction. Such other drying device, e.g., a near-infrared heater or a laser irradiation, is disposed in place of the drying drum 126 and/or the hot-air blower 128 or in addition to the drying drum 126 and the hot-air blower 128.

Meanwhile, the pretreatment unit 14 is equipped with a feed roll 14A on which the continuous paper P to be fed to the image-recording unit 12 has been wound. This feed roll 14A is rotatably supported on a frame member (not shown).

The buffer unit 16 includes, for example, a first path roller 16A, a dancer roller 16B, and a second path roller 16C which have been disposed along the paper conveying direction. The dancer roller 16B moves vertically in FIG. 1 to thereby regulate the tension of the continuous paper P being conveyed to the image-recording unit 12 and further regulate the rate of conveying the continuous paper P.

The post-treatment unit 18 is equipped with a wind-up roll 18A as an example of conveying parts for winding up the continuous paper P on which an image has been recorded. This wind-up roll 18A rotates upon reception of rotating force from a motor (not shown), and the continuous paper P is thereby conveyed along the conveying passage 124.

The buffer unit 20 includes, for example, a first path roller 20A, a dancer roller 20B, and a second path roller 20C which have been disposed along the paper conveying direction. The dancer roller 20B moves vertically in FIG. 1 to thereby regulate the tension of the continuous paper P being discharged to the post-treatment unit 18 and further regulate the rate of conveying the continuous paper P.

In the cooling unit 22, a plurality of cooling rollers 22A have been disposed. The continuous paper P is conveyed through the plurality of cooling rollers 22A, thereby cooling the continuous paper P.

Next, the operation (recording method) with the recording device 10 according to the first or second exemplary embodiment is explained.

In the recording device 10 according to the first or second exemplary embodiment, continuous paper P is first conveyed from the feed roll 14A of the pretreatment unit 14 to the image-recording unit 12 via the buffer unit 16.

Subsequently, in the image-recording unit 12, inks are ejected onto the continuous paper P from the ejection heads 122 of the ejection device 121. Thus, an image constituted of the inks is formed on the continuous paper P. Thereafter, the image (inks) on the continuous paper P is dried with the drying drum 126 from the back-surface side of the continuous paper P (i.e., the surface on the reverse side from the recording surface). Furthermore, the inks (image) ejected onto the continuous paper P are dried with the hot-air blower 128 from the front-surface side (recording surface) of the continuous paper P. Namely, the inks ejected onto the continuous paper P are dried with the drying drum 126 and the hot-air blower 128.

Next, in the cooling unit 22, the continuous paper P on which an image has been recorded is cooled with the cooling rollers 22A.

The continuous paper P on which an image has been recorded is then sent via the buffer unit 20 to the post-treatment unit 18, where the continuous paper P is wound up by the wind-up roll 18A.

Through the steps described above, an image constituted of inks is recorded on the continuous paper P as a recording medium P.

The recording device 10 according to the first or second exemplary embodiment explained above is of the type in which ink droplets are ejected directly onto a surface of a recording medium P by means of the ejection device 121 (ejection heads 122). However, the recording device of the invention is not limited thereto, and may be of the type in which ink droplets are ejected, for example, onto an intermediate transfer member and the ink droplets on the intermediate transfer member are thereafter transferred to a recording medium P.

Furthermore, although the recording device 10 according to the first or second exemplary embodiment explained above is of the type in which inks are ejected onto continuous paper P as a recording medium P to record an image thereon, the recording device of the invention may be of the type in which inks are ejected onto a sheet of paper as recording medium P to record an image thereon.

This embodiment should not be restrictively construed, and it is a matter of course that the embodiment is practiced so that the requirements according to the invention are satisfied.

Figure 2:
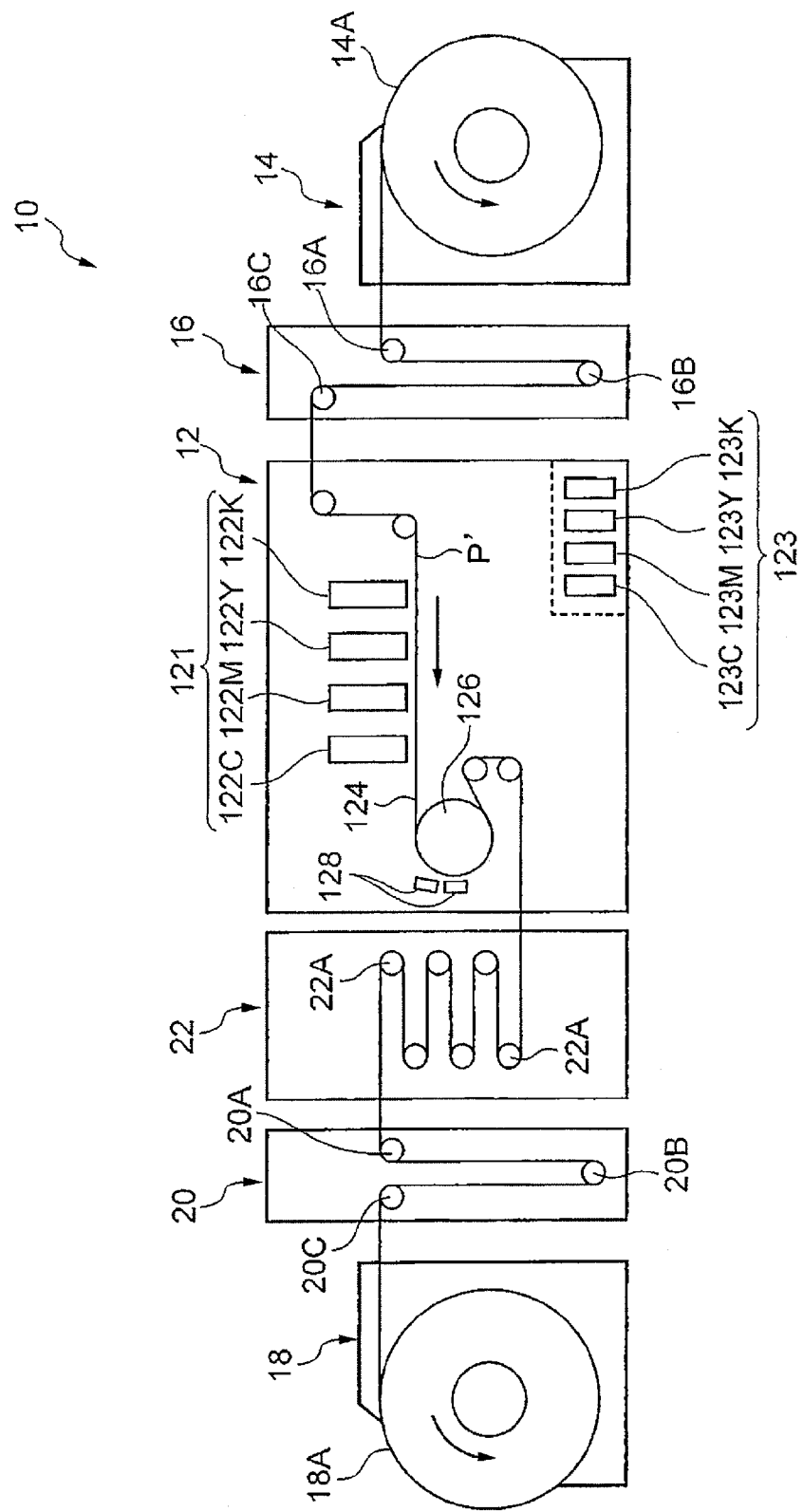
FIG. 2 is a diagrammatic view which illustrates the configuration of a recording device according to the exemplary embodiment.

FIG. 2 is a diagrammatic view which illustrates the configuration of a recording device according to a third exemplary embodiment of the invention.

The recording device 10 according to the third exemplary embodiment is a recording device which ejects one or more inks onto continuous paper (press-bonding paper for ink jet recording) P' that is configured of a base and a pressure-sensitive adhesive layer formed thereon and which thereby records an image.

The recording device 10 is equipped with ejection heads 122 (or with an ejection device 121 having ejection heads 122) which eject one or more inks onto the pressure-sensitive adhesive layer of the continuous paper P'.

With the recording device 10 according to the third exemplary embodiment, a recording method including an ejection step for ejecting an ink onto the pressure-sensitive adhesive layer of continuous paper P' is rendered possible. Thus, an image formed from the ink is recorded on the pressure-sensitive adhesive layer of the continuous paper P'.

More specifically, the recording device 10 according to the third exemplary embodiment is equipped with an image-recording unit 12 in which an image is recorded on the pressure-sensitive adhesive layer of the continuous paper P'.

The recording device 10 is equipped with a pretreatment unit 14 in which the continuous paper P' to be fed to the image-recording unit 12 is retained and with a buffer unit 16 which regulates the conveying rate, etc. of the continuous paper P' being fed from the pretreatment unit 14 to the image-recording unit 12. The buffer unit 16 has been disposed between the image-recording unit 12 and the pretreatment unit 14.

The recording device 10 is equipped, for example, with a post-treatment unit 18 for retaining therein the continuous paper P' discharged from the image-recording unit 12 and with a buffer unit 20 which regulates the conveying rate, etc. of the continuous paper P' being discharged from the image-recording unit 12 to the post-treatment unit 18. The buffer unit 20 has been disposed between the image-recording unit 12 and the post-treatment unit 18.

The recording device 10 is equipped with a cooling unit 22 which has been disposed between the image-recording unit 12 and the buffer unit 20 and which cools the continuous paper P' that has been carried out from the image-recording unit 12.

The image-recording unit 12 is equipped, for example, with roll members (reference numerals are omitted) which guide the continuous paper P' along a conveying passage 124 of the continuous paper P' and with an ejection device 121 which ejects inks (ink droplets) onto the continuous paper P' being conveyed along the conveying passage 124 of the continuous paper P' and which thereby records an image on the continuous paper P'.

The ejection device 121 is equipped with ejection heads 122 which eject inks onto the continuous paper P'. The ejection heads 122 are each, for example, a long recording head which has an effective recording area (area over which ink ejection nozzles have been disposed) not shorter than the width of the continuous paper P' (i.e., the dimension thereof along a direction that crosses (for example, is perpendicular to) the conveying direction of the continuous paper P').

The ejection heads 122 are not limited to the type shown above, and may be ejection heads that are shorter than the width of the continuous paper P' and are of the type in which each head ejects the ink while travelling in the width direction of the continuous paper P' (so-called carriage type).

The ejection heads 122 may be of the so-called thermal type in which ink droplets are ejected by heat, or may be the so-called piezoelectric type in which ink droplets are ejected by pressure. Known types are applicable.

The ejection heads 122 include, for example, an ejection head 122K which ejects an ink onto the continuous paper P' to record an image of a K (black) color thereon, an ejection head 122Y which likewise records an image of a Y (yellow) color, an ejection head 122M which likewise records an image of an M (magenta) color, and an ejection head 122C which likewise records an image of a C (cyan) color. The ejection head 122K, ejection head 122Y, ejection head 122M, and ejection head 122C have been arranged in this order from the upstream to the downstream side along the conveying direction of the continuous paper P' (hereinafter often referred to simply as "paper conveying direction") so that these ejection heads face the continuous paper P'. Incidentally, in the case where the ejection heads for K, Y, M, and C are inclusively referred to, the affixed symbols K, Y, M, and C are omitted.

The ejection heads 122K, 122Y, 122M, and 122C are connected respectively to ink cartridges 123K, 123Y, 123M, and 123C of respective colors through feed tubes (not shown), the ink cartridges being attached to and detached from the recording device 10. From the ink cartridges 123, the inks of respective colors are fed to the respective ejection heads 122.

The inks retained in the ink cartridges 123K, 123Y, 123M, and 123C of respective colors are not limited so long as at least one of these is the ink of the exemplary embodiment of the invention described above. It is, however, preferable that all the inks should each be the ink of the exemplary embodiment of the invention.

The ejection heads 122 are not limited to the mode in which four ejection heads 122 respectively corresponding to the four colors are disposed. Use may be made of a mode in which more than four ejection heads 122 respectively corresponding to more than four colors including one or more intermediate colors besides the four colors have been disposed according to purposes.

The ejection heads 122 may include, for example, either an ejection head 122 for low resolution which ejects an ink so that the amount of each ink droplet is in the range of 1-15 pL (e.g., an ejection head for 600 dpi) or an ejection head 122 for high resolution which ejects an ink so that the amount of each ink droplet is below 10 pL (e.g., an ejection head for 1,200 dpi). The ejection device 121 may be equipped with both ejection heads 122 for low resolution and ejection heads 122 for high resolution. The amount of an ink droplet for an ejection head 122 is given in terms of the range of the amount of the largest ink droplet. Furthermore, dpi means "dot per inch".

The ejection device 121 includes a drying drum 126 (an example of dryers) disposed downstream from the ejection heads 122 along the paper conveying direction. For example, the drying drum 126 has been configured so that the back surface of the continuous paper P' is wound and stretched on the drying drum 126, and the drying drum 126 dries the image (inks) on the continuous paper P' while being rotated by the contact with the continuous paper P' which is being conveyed.

A heating element (e.g., a halogen lamp heater, not shown) has been built into the drying drum 126. The drying drum 126 dries the image (inks) formed on the continuous paper P', by means of the heating by the heating element.

At the periphery of the drying drum 126, a hot-air blower 128 (an example of dryers) for drying the image (inks) formed on the continuous paper P' has been disposed. The image (inks) formed on the continuous paper P' wound and stretched on the drying drum 126 is dried with the hot air supplied from the hot-air blower 128.

In the ejection device 121, another drying device for drying the image (inks) formed on the continuous paper P', such as a near infrared ray heater (not shown) or a laser irradiator, may have been disposed downstream from the ejection heads 122 along the paper conveying direction. Such other drying device, e.g., a near infrared ray heater or a laser irradiator, is disposed in place of the drying drum 126 and/or the hot-air blower 128 or in addition to the drying drum 126 and the hot-air blower 128.

From the standpoints of the film-forming properties of the polymer particles in the ink and ease of formation of a film in which the polymer particles have been fusion-bonded to one another, a preferred drying device is one which performs drying by heating with a heating element or drying with a near infrared ray heater.

Meanwhile, the pretreatment unit 14 is equipped with a feed roll 14A on which the continuous paper P' to be fed to the image-recording unit 12 has been wound. This feed roll 14A is rotatably supported on a frame member (not shown).

The buffer unit 16 includes, for example, a first path roller 16A, a dancer roller 16B, and a second path roller 16C which have been disposed along the paper conveying direction. The dancer roller 16B moves vertically in FIG. 2 to thereby regulate the tension of the continuous paper P' being conveyed to the image-recording unit 12 and further regulate the rate of conveying the continuous paper P'.

The post-treatment unit 18 is equipped with a wind-up roll 18A as an example of conveying parts for winding up the continuous paper P on which an image has been recorded. This wind-up roll 18A rotates upon reception of rotating force from a motor (not shown), and the continuous paper P' is thereby conveyed along the conveying passage 124.

The buffer unit 20 includes, for example, a first path roller 20A, a dancer roller 20B, and a second path roller 20C which have been disposed along the paper conveying direction. The dancer roller 20B moves vertically in FIG. 2 to thereby regulate the tension of the continuous paper P' being discharged to the post-treatment unit 18 and further regulate the rate of conveying the continuous paper P'.

In the cooling unit 22, a plurality of cooling rollers 22A have been disposed. The continuous paper P' is conveyed through the plurality of cooling rollers 22A, thereby cooling the continuous paper P'.

Next, the operation (recording method) with the recording device 10 according to the third exemplary embodiment is explained.

In the recording device 10 according to the third exemplary embodiment, continuous paper P' is first conveyed from the feed roll 14A of the pretreatment unit 14 to the image-recording unit 12 via the buffer unit 16.

Subsequently, in the image-recording unit 12, inks are ejected onto the pressure-sensitive adhesive layer of the continuous paper P' from the ejection heads 122 of the ejection device 121. Thus, an image constituted of the inks is formed on the pressure-sensitive adhesive layer of the continuous paper P'. Thereafter, the image (inks) on the continuous paper P' is dried with the drying drum 126 from the back-surface side of the continuous paper P' (i.e., the surface on the reverse side from the recording surface). Furthermore, the inks (image) ejected onto the continuous paper P' are dried with the hot-air blower 128 from the front-surface side (recording surface) of the continuous paper P'. Namely, the inks ejected onto the continuous paper P' are dried with the drying drum 126 and the hot-air blower 128.

Next, in the cooling unit 22, the continuous paper P' on which an image has been recorded is cooled with the cooling rollers 22A.

The continuous paper P' on which an image has been recorded is then sent via the buffer unit 20 to the post-treatment unit 18, where the continuous paper P' is wound up by the wind-up roll 18A.

Through the steps described above, an image constituted of inks is recorded on the pressure-sensitive adhesive layer of the continuous paper P' as press-bonding paper.

The continuous paper P' which bears the image thus recorded is subjected to a cutting step, in which the continuous paper is cut into a desired size (e.g., a size which, when folded in two or three, becomes the postal-card size).

The cut press-bonding paper is folded in two or three, and thereafter the opposed surfaces are press-bonded to each other.

For this press bonding, a known press-bonding device (laminator) may be used.

The cutting and press bonding may be conducted also with a known mail sealer.

Conditions for the press bonding may be determined in accordance with the press-bonding paper used and the peel force for peeling off the press-bonded portions. This peel force is not limited so long as the peel force is, for example, in the range of 300-800 gf in the case of press-bonded postal cards.

The recording device 10 according to the third exemplary embodiment explained above is of the type in which ink droplets are ejected directly onto a surface of a recording medium P' by means of the ejection device 121 (ejection heads 122). However, the recording device of the invention is not limited thereto, and may be of the type in which ink droplets are ejected, for example, onto an intermediate transfer member and the ink droplets on the intermediate transfer member are thereafter transferred to a recording medium P'.

Furthermore, although the recording device 10 according to the third exemplary embodiment explained above is of the type in which inks are ejected onto continuous paper P' in a roll form to record an image thereon, the recording device of the invention may be of the type in which inks are ejected onto a sheet of paper with a desired size to record an image thereon.

The press-bonding paper to be applied to the recording device (and recording method) according to the third exemplary embodiment is not limited so long as the paper is press-bonding paper for ink-jet recording, i.e., press-bonding paper equipped with a pressure-sensitive adhesive layer which serves also as an ink-receiving layer. The press-bonding paper may be continuous paper such as the roll-form paper used above or continuous document paper, or may be sheets of paper which have been cut into a desired size beforehand.

Specific examples of the press-bonding paper include ink-jet press-bonding paper (IJ•P Mail N, IJ•W Mail PN, and IJ•W Mail P) manufactured by Hokuetsu Kishu Paper Co., Ltd.) and ink jet press-bonding paper (Bright Mail IJ) manufactured by Daio Paper Corp.).

This third exemplary embodiment should not be restrictively construed, and it is a matter of course that the embodiment is practiced so that the requirements according to the invention are satisfied.

EXAMPLES

The invention will be explained below in detail by reference to Examples, but the invention should not be construed as being limited to the following Examples in any way.

Example 1

(Black Ink; Expressed by "K Ink")

Carbon black (Mogul L, manufactured by Cabot Corp.) (colorant): 5% by mass

Styrene/acrylic acid copolymer neutralized with sodium: 2.5% by mass
  (water-soluble resin; weight-average molecular weight=30,000)

TOCRYL W-4627 (acrylic emulsion manufactured by Toyo Chem Co., Ltd.): 5.0% by mass (solid amount)
  (polymer particle; volume-average particle diameter=0.12 μm; glass transition temperature=45° C.)

Glycerin: 10% by mass

Diethylene glycol: 10% by mass

Surfactants (compounds shown in Table 1): the amounts in % by mass shown in Table 1

Ion-exchanged water: remainder

The ingredients shown above are mixed together, and the resultant mixture was filtered with a 5-μm filter to obtain a water-based ink (K ink).

(Cyan Ink; Expressed by "C Ink")

C.I. Pigment Blue 15:3 (colorant): 5% by mass

Styrene/acrylic acid copolymer neutralized with sodium: 2.5% by mass (water-soluble resin; weight-average molecular weight=30,000)

Glycerin: 10% by mass

Diethylene glycol: 10% by mass

Diethylene glycol monobutyl ether: 3% by mass

Surfactant (compound shown in Table 1): the amount in % by mass shown in Table 1

Ion-exchanged water: remainder

The ingredients shown above are mixed together, and the resultant mixture is filtered with a 5-μm filter to obtain a water-based ink (C ink).

(Magenta Ink; Expressed by "M Ink")

An M ink is obtained in the same manner as for the C ink, except that C.I. Pigment Red 122 is used as a colorant.

(Yellow Ink; Expressed by "Y Ink")

A Y ink is obtained in the same manner as for the C ink, except that C.I. Pigment Yellow 128 is used as a colorant.

(Ink Set)

The K ink, C ink, M ink, and Y ink obtained are used as an ink set of Example 1.

Example 2 and Comparative Examples 1 to 3

Ink sets are prepared in the same manner as in Example 1, except that the kinds of surfactants and the amounts thereof (% by mass) are changed in accordance with Table 1.

Example 11

(Black Ink; Expressed by "K Ink")

Carbon black (Mogul L, manufactured by Cabot Corp.) (colorant): 5% by mass

Styrene/acrylic acid copolymer neutralized with sodium: 2.5% by mass (water-soluble resin; weight-average molecular weight=30,000)

TOCRYL W-4627 (acrylic emulsion manufactured by Toyo Chem Co., Ltd.): 5.0% by mass (solid amount) (polymer particle; volume-average particle diameter=0.12 μm; glass transition temperature=45° C.)

Glycerin: 10% by mass

Diethylene glycol: 10% by mass

Surfactants (compounds shown in Table 2): the amounts in % by mass shown in Table 2

Ion-exchanged water: remainder

The ingredients shown above are mixed together, and the resultant mixture is filtered with a 5-μm filter to obtain a water-based ink (K ink). The K ink obtained is evaluated as the ink of Example 11.

Example 12 and Comparative Examples 11 to 13

Inks are prepared in the same manner as in Example 11, except that the kinds of surfactants and the amounts thereof (% by mass) are changed in accordance with Table 2.

<Evaluation>

(Preparation of Recording Device)

A recording device having the same configuration as that shown in FIG. 1 and equipped with 600-dpi piezoelectric heads (amount of largest ink droplet, 11 pL) as ink ejection heads is prepared. Details of the recording device prepared are as follows. The set temperatures of the drying drum and hot-air blower are set temperatures which make the recording medium just after drying have a surface temperature of 60° C.

—Details of Recording Device—

Recording speed (conveying speed of recording medium): 25 m/min

Set temperature of drying drum: 100° C.

Set temperature of hot-air blower: 100° C.

Recording media: the following three kinds: "NPi Form Next-IJ (basis weight, 64 g/m$^2$)", manufactured by Nippon Paper Industries Co., Ltd., "permeable recording medium"; "NPi Form (basis weight, 64 g/m$^2$)", manufactured by Nippon Paper Industries Co., Ltd., "permeable recording medium"; and "OK Topcoat+", manufactured by Oji Paper Co., Ltd., (ream weight, 43 kg) "impermeable recording medium"

The inks of respective colors of the ink set of each Example or Comparative Example and the ink of each Example or Comparative Example are packed into the ink tanks for respective colors of the recording device. This recording device is used to conduct the following evaluation.

(Strike-Through)

Using each recording device, the K ink is ejected from the 600-dpi piezoelectric head (amount of largest ink droplet, 11 pL) onto "NPi Form Next-IJ", manufactured by Nippon Paper Industries Co., Ltd., and "NPi Form", manufactured by Nippon Paper Industries Co., Ltd., as permeable recording media to record thereon solid images of 1.5 cm×1.5 cm formed from the ink. Thereafter, these recording media are subjected to drying with the drying drum and the hot-air blower and to cooling with the cooling rollers. Through these steps, images formed from the ink are recorded on the permeable recording media.

The solid K-ink images recorded are visually examined from the back side of each recording medium (from the side opposite from the recording surface) and evaluated for strike-through.

The criteria for the evaluation are as follows.

—Criteria for Strike-Through Evaluation—

A (good): There is no strike-through.

B (fair): There is slight strike-through.

C (poor): There is considerable strike-through.

(Image Blurring)

Using each recording device, the K ink is ejected from the 600-dpi piezoelectric head (amount of largest ink droplet, 11 pL) onto "NPi Form Next-IJ", manufactured by Nippon Paper Industries Co., Ltd., and "NPi Form", manufactured by Nippon Paper Industries Co., Ltd., as permeable recording media to record thereon character images (images of 6-pt kanji character "hibiki") formed from the ink. Thereafter, these recording media are subjected to drying with the drying drum and the hot-air blower and to cooling with the cooling rollers. Through these steps, images formed from the ink are recorded on the permeable recording media.

The K-ink character images recorded are visually examined and evaluated for character-image blurring (blurring between colors).

In the case of the recording device in which the inks of the ink set of each Example or Comparative Example are packed, solid images are formed respectively from the C ink, M ink, and Y ink as undercoat colors for the character images to be formed from the K ink, and the character images are evaluated for color blurring (blurring between colors).

The criteria for the evaluation are as follows.

—Criteria for Image Blurring—

A+ (excellent): No image blurring occurred even on undercoat colors.

A (good): No image blurring occurred without undercoat color.

B (fair): Slight image blurring occurred without undercoat color.

C (poor): Considerable image blurring occurred even without undercoat color.

(Image Peeling)

Using each recording device, the K ink is ejected from the 600-dpi piezoelectric head (amount of largest ink droplet, 11 pL) onto "OK Topcoat+", manufactured by Oji Paper Co., Ltd., as an impermeable recording medium to record thereon character images (images of 6-pt kanji character "hibiki") formed from the ink. Thereafter, the recording medium is subjected to drying with the drying drum and the hot-air blower and to cooling with the cooling rollers. Through these steps, images formed from the ink are recorded on the impermeable recording medium.

The K-ink character images recorded are visually examined and evaluated for image peeling due to drying failure.

The criteria for the evaluation are as follows.

—Criteria for Image Peeling Evaluation—

A (good): no peeling is observed in the images

B (fair): part of the images have peeled off

C (poor): the images have suffered considerable peeling and caused fouling

The strike-through evaluation and the image blurring evaluation are conducted similarly also under the conditions (1) wherein the drying with the drying drum and hot-air blower is omitted and the conditions (2) wherein drying with the drying drum and the hot-air blower is conducted so that each recording medium just after the drying had a surface temperature of 200° C.

Incidentally, under the conditions (1) wherein the drying is omitted, the surface temperature of each recording medium is 25° C. before and after the recording.

Details of the Examples and Comparative Examples and of the results of the evaluation are shown in Table 1 to Table 4 below.

TABLE 1

|  | Kind of ink | Surfactants (% by mass) | | | | | |
|---|---|---|---|---|---|---|---|
|  |  | Ethylene oxide adduct of acetylene glycol | | | | Polyether-modified silicone | |
|  |  | Olfin E1010 | Olfin EXP4001 | Olfin EXP4123 | Olfin E1020 | Silface SAG002 | Silface SAG503A |
| Example 1 | K ink | 2 |  | 2 |  |  |  |
|  | C ink | 1 |  |  |  |  |  |
|  | M ink | 1 |  |  |  |  |  |
|  | Y ink | 1 |  |  |  |  |  |
| Example 2 | K ink | 2 | 1 |  |  |  |  |
|  | C ink | 1 |  |  |  |  |  |
|  | M ink | 1 |  |  |  |  |  |
|  | Y ink | 1 |  |  |  |  |  |
| Comparative Example 1 | K ink | 1 |  |  |  |  |  |
|  | C ink | 1 |  |  |  |  |  |
|  | M ink | 1 |  |  |  |  |  |
|  | Y ink | 1 |  |  |  |  |  |
| Comparative Example 2 | K ink | 2 | 0.5 |  |  |  |  |
|  | C ink | 1 |  |  |  |  |  |
|  | M ink | 1 |  |  |  |  |  |
|  | Y ink | 1 |  |  |  |  |  |
| Comparative Example 3 | K ink | 2 |  | 3 |  |  |  |
|  | C ink | 1 |  |  |  |  |  |
|  | M ink | 1 |  |  |  |  |  |
|  | Y ink | 1 |  |  |  |  |  |

TABLE 2

|  | Kind of ink | Surfactants (% by mass) | | | | | |
|---|---|---|---|---|---|---|---|
|  |  | Ethylene oxide adduct of acetylene glycol | | | | Polyether-modified silicone | |
|  |  | Olfin E1010 | Olfin EXP4001 | Olfin EXP4123 | Olfin E1020 | Silface SAG002 | Silface SAG503A |
| Example 11 | K ink | 2 |  | 3 |  |  |  |
| Example 12 | K ink | 2 |  |  |  | 0.2 |  |
| Comparative Example 11 | K ink | 0.3 |  |  |  | 0.2 |  |
| Comparative Example 12 | K ink | 0.3 |  |  | 4 |  |  |
| Comparative Example 13 | K ink | 2 | 0.5 |  |  |  |  |

TABLE 3

| | Kind of ink | Dynamic surface tension (mN/m) 1 msec | Dynamic surface tension (mN/m) 1 sec | Width of variations | Static surface tension (mN/m) | |
|---|---|---|---|---|---|---|
| Example 1 | K ink | 27.7 | 26.5 | 1.2 | 22 | corresponding to ink (1) |
| | C ink | 40.1 | 37.1 | 3.0 | 36 | corresponding to ink (2) |
| | M ink | 41.6 | 37.7 | 3.9 | 36 | corresponding to ink (2) |
| | Y ink | 38.6 | 36.7 | 1.9 | 35 | corresponding to ink (2) |
| Example 2 | K ink | 29.0 | 28.2 | 0.8 | 27 | corresponding to ink (1) |
| | C ink | 40.1 | 37.1 | 3.0 | 36 | corresponding to ink (2) |
| | M ink | 41.6 | 37.7 | 3.9 | 36 | corresponding to ink (2) |
| | Y ink | 38.6 | 36.7 | 1.9 | 35 | corresponding to ink (2) |
| Comparative Example 1 | K ink | 38.2 | 36.5 | 1.7 | 36 | corresponding to ink (2) |
| | C ink | 40.1 | 37.1 | 3.0 | 36 | corresponding to ink (2) |
| | M ink | 41.6 | 37.7 | 3.9 | 36 | corresponding to ink (2) |
| | Y ink | 38.6 | 36.7 | 1.9 | 35 | corresponding to ink (2) |
| Comparative Example 2 | K ink | 32.1 | 30.6 | 1.5 | 28 | |
| | C ink | 40.1 | 37.1 | 3.0 | 36 | corresponding to ink (2) |
| | M ink | 41.6 | 37.7 | 3.9 | 36 | corresponding to ink (2) |
| | Y ink | 38.6 | 36.7 | 1.9 | 35 | corresponding to ink (2) |
| Comparative Example 3 | K ink | 34.7 | 26.1 | 8.6 | 24 | |
| | C ink | 40.1 | 37.1 | 3.0 | 36 | corresponding to ink (2) |
| | M ink | 41.6 | 37.7 | 3.9 | 36 | corresponding to ink (2) |
| | Y ink | 38.6 | 36.7 | 1.9 | 35 | corresponding to ink (2) |
| Example 11 | K ink | 29.1 | 28.9 | 0.2 | 28 | corresponding to ink (1) |
| Example 12 | K ink | 28.8 | 26.2 | 2.5 | 22 | corresponding to ink (1) |
| Comparative Example 11 | K ink | 34.7 | 26.1 | 8.6 | 24 | |
| Comparative Example 12 | K ink | 39.6 | 35.7 | 4.9 | 34 | corresponding to ink (2) |
| Comparative Example 13 | K ink | 32.1 | 30.6 | 1.5 | 28 | |

TABLE 4

| | With drying (recording medium surface temperature = 60° C.) | | | | | Without drying (recording medium surface temperature = 25° C.) | | | | With drying (recording medium surface temperature = 200° C.) | | | |
|---|---|---|---|---|---|---|---|---|---|---|---|---|---|
| | Strike-through | | Image blurring | | Image peeling OK Topcoat+ | Strike-through | | Image blurring | | Strike-through | | Image blurring | |
| | NPi Form Next-IJ | NPi Form | NPi Form Next-IJ | NPi Form | | NPi Form Next-IJ | NPi Form | NPi Form Next-IJ | NPi Form | NPi Form Next-IJ | NPi Form | NPi Form Next-IJ | NPi Form |
| Example 1 | A (good) | A (good) | A+ (excellent) | A (good) | A (good) | A (good) | A (good) | A+ (excellent) | A (good) | A (good) | A (good) | A+ (excellent) | A+ (excellent) |
| Example 2 | A (good) | A (good) | A+ (excellent) | A (good) | A (good) | A (good) | A (good) | A+ (excellent) | A (good) | A (good) | A (good) | A+ (excellent) | A+ (excellent) |
| Comparative Example 1 | B (fair) | B (fair) | B (fair) | B (fair) | C (poor) | C (poor) | C (poor) | C (poor) | C (poor) | A (good) | A (good) | A (good) | A (good) |
| Comparative Example 2 | A (good) | A (good) | A (good) | A (good) | B (fair) | C (poor) | C (poor) | C (poor) | C (poor) | A (good) | A (good) | A (good) | A (good) |
| Comparative Example 3 | C (poor) | C (poor) | C (poor) | C (poor) | C (poor) | C (poor) | C (poor) | C (poor) | C (poor) | C (poor) | C (poor) | C (poor) | C (poor) |
| Example 11 | A (good) | A (good) | A+ (excellent) | A (good) | A (good) | A (good) | A (good) | A+ (excellent) | A (good) | A (good) | A (good) | A+ (excellent) | A+ (excellent) |
| Example 12 | A (good) | A (good) | A+ (excellent) | A (good) | A (good) | A (good) | A (good) | A+ (excellent) | A (good) | A (good) | A (good) | A+ (excellent) | A+ (excellent) |
| Comparative Example 11 | A (good) | A (good) | A (good) | A (good) | B (fair) | B (fair) | B (fair) | B (fair) | B (fair) | A (good) | A (good) | A (good) | A (good) |
| Comparative Example 12 | B (fair) | B (fair) | B (fair) | B (fair) | C (poor) | C (poor) | C (poor) | C (poor) | C (poor) | A (good) | A (good) | A (good) | A (good) |
| Comparative Example 13 | A (good) | A (good) | A (good) | A (good) | B (fair) | C (poor) | C (poor) | C (poor) | C (poor) | A (good) | A (good) | A (good) | A (good) |

It can be seen from the results given above that the inks and ink sets of the Examples were more effective in inhibiting all of strike-through, image blurring, and image peeling as compared with the inks and ink sets of the Comparative Examples.

Consequently, it can be seen that the inks and ink sets of the Examples enable satisfactory images to be recorded on both permeable recording media and impermeable recording media and are applicable to a wide variety of recording media.

Incidentally, the abbreviations and other details of the surfactants shown in Table 1 and Table 2 are as follows.
—Ethylene Oxide Adducts of Acetylene Glycol (Nissin Chemical Industry Co., Ltd.)—
  Olfin E1010 (HLB=13-14)
  Olfin EXP.4001 (HLB=8-11)
  Olfin EXP.4123 (HLB=11-14)
  Olfin E1020 (HLB=15-16)
—Polyether-Modified Silicones (Nissin Chemical Industry Co., Ltd.)—
  Silface SAG002 (HLB=12)
  Silface SAG503A (HLB=11)

Example 2-1

(Preparation of Ink)
  Carbon black (Mogul L, manufactured by Cabot Corp.) (colorant): 5% by mass
  Styrene/acrylic acid copolymer neutralized with sodium: 2.5% by mass
    (water-soluble resin; weight-average molecular weight=30,000)
  TOCRYL (manufactured by Toyo Chem Co., Ltd.): 5.0% by mass (solid amount)
    (acrylic emulsion; polymer particles; volume-average particle diameter=0.12 μm; glass transition temperature=45° C.)
  Glycerin: 10% by mass
  Surfactants (compounds shown in Table 5): the amounts in % by mass shown in Table 5
  Ion-exchanged water: remainder The ingredients shown above are mixed together, and the resultant mixture is filtered with a 5-μm filter to obtain an ink.

Examples 2-2 and 2-3 and Comparative Examples 2-1 to 2-4

Inks are obtained in the same manner as in Example 2-1, except that the kinds of surfactants and the amounts thereof (% by mass) are changed in accordance with Table 5.

<Determination of Properties>
The inks obtained above were examined for static surface tension, dynamic surface tension at 1 msec after and at 1 sec after, and the width of variations in dynamic surface tension by the methods described above.
The results thereof are shown in Table 5.

<Evaluation>
(Preparation of Recording Device)
A recording device having the same configuration as that shown in FIG. 2 and equipped with 600-dpi piezoelectric heads (amount of largest ink droplet, 11 pL) as ink ejection heads is prepared.

As the continuous paper P' to be applied to the recording device, the press-bonding paper shown below was used.
Details of the recording device are as follows.
—Details of Recording Device—
  Recording speed (conveying speed of recording medium): 25 m/min
  Set temperature of drying drum: 100° C.
  Set temperature of hot-air blower: 100° C.
  Continuous paper (press-bonding paper): IJ•W Mail PN (ink-jet press-bonding paper manufactured by Hokuetsu Kishu Paper Co., Ltd.)

Each of the inks is packed into the recording device.
This recording device is used to conduct the following image recording.

(Image Recording)
Using each recording device, the ink is ejected from the 600-dpi piezoelectric head (amount of largest ink droplet, 11 pL) onto the pressure-sensitive adhesive layer of press-bonding paper IJ•W Mail PN to record thereon 1.5 cm×1.5 cm solid images and images configured of characters and rules. Thereafter, this press-bonding paper is subjected to drying with the drying drum and the hot-air blower and to cooling with the cooling rollers. Through these steps, images formed from the ink are recorded on the pressure-sensitive adhesive layer (with thermal drying).

Meanwhile, images formed from each ink are recorded on the pressure-sensitive adhesive layer in the same manner as described above, except that the set temperatures of the drying drum and hot-air blower are changed to 30° C. (without thermal drying).

The press-bonding paper bearing the recorded images is cut into a size which, when folded in three, becomes the postal-card size.

Each cut sample is subsequently allowed to stand overnight and then press-bonded. The press bonding is conducted under conditions which results in a peel force of 500 gf when the press-bonded portions are peeled off Thereafter, the press-bonded portions are opened (peeled off), and the degree of image transfer to the opposed surface is visually evaluated. The criteria for the evaluation are as follows. The results of the evaluation are shown in Table 5 below.
—Degree of Image Transfer—
  A+: transfer of characters/rules is slight
  A: transfer of characters/rules is observed but is relatively slight
  B: considerable transfer has occurred in both solid-image part and characters/rules
  C: considerable transfer has occurred in both solid-image part and character/rule part, and the transfer affects readability of the printed area in the opposed surface

TABLE 5

|  | Surfactants | | | | Content of polymer particles (mass %) | Static surface tension (mN/m) | Dynamic surface tension (mN/m) | | | Image transfer to opposed surface | |
|  | Kind | Amount (mass %) | Kind | Amount (mass %) | | | 1 msec | 1 sec | Width of variations | With thermal drying | Without thermal drying |
| --- | --- | --- | --- | --- | --- | --- | --- | --- | --- | --- | --- |
| Example 2-1 | Olfin E1010 | 2 | Silface SAG002 | 0.1 | 5 | 26 | 27.8 | 26.6 | 1.2 | A+ | A |

TABLE 5-continued

| | Surfactants | | | | Content of polymer particles (mass %) | Static surface tension (mN/m) | Dynamic surface tension (mN/m) | | | Image transfer to opposed surface | |
|---|---|---|---|---|---|---|---|---|---|---|---|
| | Kind | Amount (mass %) | Kind | Amount (mass %) | | | 1 msec | 1 sec | Width of variations | With thermal drying | Without thermal drying |
| Example 2-2 | Olfin E1010 | 2 | Olfin EXP.4123 | 2 | 3 | 22 | 27.7 | 26.5 | 1.2 | A+ | A |
| Example 2-3 | Olfin E1010 | 2 | Olfin EXP.4001 | 1.5 | 2 | 25 | 30.3 | 28.7 | 1.6 | A+ | A |
| Comparative Example 2-1 | Olfin E1010 | 1 | Silface SAG002 | 0.1 | 0 | 36 | 38.2 | 36.5 | 1.7 | C | C |
| Comparative Example 2-2 | Olfin E1010 | 1 | Silface SAG002 | 0.1 | 2 | 36 | 38.3 | 36.6 | 1.7 | B | C |
| Comparative Example 2-3 | Olfin E1010 | 2 | Olfin EXP.4300 | 1 | 1 | 26 | 29.9 | 27.9 | 2.0 | B | C |
| Comparative Example 2-4 | Olfin E1010 | 2 | Silface SAG503A | 0.1 | 2 | 25 | 30.8 | 27.8 | 3.0 | B | B |

It can be seen from the results given above that the images recorded on the pressure-sensitive adhesive layer of the press-bonding paper using the inks of the Examples are inhibited from being transferred to the opposed surface, as compared with the images recorded using the inks of the Comparative Examples, when the opposed surface is peeled off after press bonding.

Incidentally, the abbreviations and other details of the surfactants shown in Table 5 are as follows.

—Ethylene Oxide Adducts of Acetylene Glycol (Nissin Chemical Industry Co., Ltd.)—

Olfin E1010 (HLB=13-14)
Olfin EXP.4001 (HLB=8-11)
Olfin EXP.4123 (HLB=11-14)
Olfin EXP.4300 (HLB=10-13)

—Polyether-Modified Silicones (Nissin Chemical Industry Co., Ltd.)—

Silface SAG002 (HLB=12)
Silface SAG503A (HLB=11)

Example 3-1

(Cyan Ink; Expressed by "C Ink")

C.I. Pigment Blue 15:3 (colorant): 5% by mass
Styrene/acrylic acid copolymer neutralized with sodium: 2.5% by mass
(water-soluble resin; weight-average molecular weight=30,000)
TOCRYL W-4627 (acrylic emulsion manufactured by Toyo Chem Co., Ltd.): 2.5% by mass (solid amount)
(polymer particles; volume-average particle diameter=0.12 μm; glass transition temperature=45° C.)
Glycerin: 10% by mass
Surfactants (compounds shown in Table 6): the amounts in % by mass shown in Table 6
Ion-exchanged water: remainder The ingredients shown above are mixed together, and the resultant mixture is filtered with a 5-μm filter to obtain a water-based ink (C ink).

(Magenta Ink; Expressed by "M Ink")

An M ink is obtained in the same manner as for the C ink, except that C.I. Pigment Red 122 is used as a colorant.

(Yellow Ink; Expressed by "Y Ink")

A Y ink is obtained in the same manner as for the C ink, except that C.I. Pigment Yellow 128 is used as a colorant.

(Black Ink; Expressed by "K Ink")

A K ink is obtained in the same manner as for the C ink, except that carbon black (Mogul L, manufactured by Cabot Corp.) is used as a colorant.

(Ink Set)

The C ink, M ink, Y ink, and K ink obtained are used as an ink set of Example 3-1.

Examples 3-2 to 3-7 and Comparative Examples 3-1 to 3-5

Ink sets are prepared in the same manner as in Example 3-1, except that the kinds of surfactants and the amounts thereof (% by mass) are changed in accordance with Table 6 and Table 7.

<Evaluation>

(Preparation of Recording Device)

A recording device having the same configuration as that shown in FIG. 1 and equipped with 600-dpi piezoelectric heads (amount of largest ink droplet, 11 pL) as ink ejection heads is prepared. Details of the recording device prepared are as follows.

—Details of Recording Device—

Recording speed (conveying speed of recording medium): 25 m/min
Set temperature of drying drum: 100° C.
Set temperature of hot-air blower: 100° C.
Impermeable recording medium: "OK Topcoat+", manufactured by Oji Paper Co., Ltd. (ream weight, 43 kg)

The inks of respective colors of the ink set of each Example or Comparative Example are packed into the ink tanks for respective colors of the recording device. This recording device is used to conduct the following image recording.

(Image Recording)

Using each recording device, the inks are ejected from the 600-dpi piezoelectric heads (amount of largest ink droplet, 11 pL) onto "OK Topcoat+", manufactured by Oji Paper Co., Ltd., as an impermeable recording medium to record thereon solid images of 1.5 cm×1.5 cm (solid images of three colors formed from the C ink, M ink, and Y ink and solid images of four colors formed from the inks of the four colors). Thereafter, this recording medium is subjected to drying with the drying drum and the hot-air blower and to cooling with the cooling rollers. Through these steps, images formed from the inks are recorded on the impermeable recording medium.

The images recorded are visually examined and evaluated for image peeling due to drying failure. The criteria for the evaluation are as follows.

—Criteria for Image Peeling Evaluation—

A+ (excellent): no peeling is observed in the four-color portions of the images

A (good): no peeling is observed in the three-color portions of the images

B (fair): part of the images have peeled off

C (poor): the images have suffered considerable peeling and caused fouling

Details of the Examples and Comparative Examples and of the results of the evaluation are shown in Table 6 to Table 9 below.

In the column "Difference in width of variations" under "Dynamic surface tension", each upper numeral indicates a maximum value of the difference in the width of variations in dynamic surface tension between the inks of four colors, i.e., the C ink, M ink, Y ink, and K ink. Meanwhile, each lower numeral in the parenthesis indicates a maximum value of the difference in the width of variations in dynamic surface tension between the inks of three colors, i.e., the C ink, M ink, and Y ink.

TABLE 6

|  | | Surfactants (% by mass) | | | | | |
|  | | Ethylene oxide adduct of acetylene glycol | | | | Polyether-modified silicone | |
|  | Kind of ink | Olfin E1010 | Olfin EXP4001 | Olfin EXP4123 | Olfin EXP4300 | Silface SAG002 | Silface SAG503A |
| Example 3-1 | C ink | 2 |  | 1.5 |  |  |  |
|  | M ink | 2 |  | 2 |  |  |  |
|  | Y ink | 2 |  | 2 |  |  |  |
|  | K ink | 2 |  | 2 |  |  |  |
| Example 3-2 | C ink | 2 |  |  |  | 0.4 |  |
|  | M ink | 2 |  |  |  | 0.4 |  |
|  | Y ink | 2 |  |  |  | 0.4 |  |
|  | K ink | 2 |  |  |  | 0.4 |  |
| Example 3-3 | C ink | 2 | 1.5 |  |  |  |  |
|  | M ink | 2 | 1.5 |  |  |  |  |
|  | Y ink | 2 | 1.5 |  |  |  |  |
|  | K ink | 2 | 1.5 |  |  |  |  |
| Example 3-4 | C ink | 2 |  |  | 1 |  |  |
|  | M ink | 2 | 1 |  |  |  |  |
|  | Y ink | 2 | 1 |  |  |  |  |
|  | K ink | 2 | 0.8 |  |  |  |  |
| Example 3-5 | C ink | 2 | 0.1 |  |  |  |  |
|  | M ink | 2 | 0.5 |  |  |  |  |
|  | Y ink | 2 | 0.1 |  |  |  |  |
|  | K ink | 2 |  |  |  |  | 0.1 |
| Example 3-6 | C ink | 2 |  | 3 |  |  |  |
|  | M ink | 2 |  | 3 |  |  |  |
|  | Y ink | 2 |  | 3 |  |  |  |
|  | K ink | 2 |  | 3 |  |  |  |
| Example 3-7 | C ink | 2 |  |  | 1 |  |  |
|  | M ink | 2 | 1 |  |  |  |  |
|  | Y ink | 2 | 1 |  |  |  |  |
|  | K ink | 2 | 0.5 |  |  |  |  |

TABLE 7

|  | | Surfactants (% by mass) | | | | | |
|  | | Ethylene oxide adduct of acetylene glycol | | | | Polyether-modified silicone | |
|  | Kind of ink | Olfin E1010 | Olfin EXP4001 | Olfin EXP4123 | Olfin EXP4300 | Silface SAG002 | Silface SAG503A |
| Comparative Example 3-1 | C ink | 1 |  |  |  |  | 0.2 |
|  | M ink | 1 |  | 2 |  |  |  |
|  | Y ink | 1 |  | 2 |  |  |  |
|  | K ink | 1 |  |  |  | 0.1 |  |
| Comparative Example 3-2 | C ink | 1 | 0.1 |  |  |  |  |
|  | M ink | 1 | 0.1 |  |  |  |  |
|  | Y ink | 1 | 0.1 |  |  |  |  |
|  | K ink | 1 | 0.1 |  |  |  |  |
| Comparative Example 3-3 | C ink | 2 |  |  | 0.5 |  |  |
|  | M ink | 2 |  |  | 0.5 |  |  |
|  | Y ink | 2 |  |  |  |  | 0.1 |
|  | K ink | 2 | 1 |  |  |  |  |

TABLE 7-continued

| | | Surfactants (% by mass) | | | | | |
|---|---|---|---|---|---|---|---|
| | | Ethylene oxide adduct of acetylene glycol | | | | Polyether-modified silicone | |
| | Kind of ink | Olfin E1010 | Olfin EXP4001 | Olfin EXP4123 | Olfin EXP4300 | Silface SAG002 | Silface SAG503A |
| Comparative Example 3-4 | C ink | | 0.05 | | | | 0.08 |
| | M ink | | 0.05 | | | | 0.05 |
| | Y ink | | 0.05 | | | | 0.02 |
| | K ink | | 0.05 | | | | |
| Comparative Example 3-5 | C ink | 2 | | | | 0.2 | |
| | M ink | 2 | | | | 0.2 | |
| | Y ink | 2 | | | | 0.1 | |
| | K ink | 2 | | | | 0.2 | |

TABLE 8

| | Kind of ink | Dynamic surface tension (mN/m) | | | | Static surface tension (mN/m) | Image peeling |
|---|---|---|---|---|---|---|---|
| | | 1 msec | 1 sec | Width of variations | Difference in width of variations | | |
| Example 3-1 | C ink | 29.1 | 27.1 | 2.0 | 0.8 | 22 | A+ (excellent) |
| | M ink | 27.2 | 26.0 | 1.2 | (0.8) | 22 | |
| | Y ink | 26.8 | 25.6 | 1.2 | | 22 | |
| | K ink | 27.7 | 26.5 | 1.2 | | 22 | |
| Example 3-2 | C ink | 27.8 | 26.6 | 1.2 | 0.7 | 21 | A+ (excellent) |
| | M ink | 27.1 | 25.7 | 1.4 | (0.2) | 21 | |
| | Y ink | 27.4 | 26.1 | 1.3 | | 21 | |
| | K ink | 28.4 | 26.5 | 1.9 | | 21 | |
| Example 3-3 | C ink | 28.7 | 27.4 | 1.3 | 0.3 | 25 | A+ (excellent) |
| | M ink | 28.8 | 27.7 | 1.1 | (0.2) | 24 | |
| | Y ink | 28.7 | 27.4 | 1.3 | | 26 | |
| | K ink | 30.3 | 28.9 | 1.4 | | 25 | |
| Example 3-4 | C ink | 29.9 | 28.0 | 1.9 | 0.7 | 27 | A+ (excellent) |
| | M ink | 29.0 | 27.8 | 1.2 | (0.7) | 27 | |
| | Y ink | 28.8 | 27.6 | 1.2 | | 27 | |
| | K ink | 28.8 | 27.6 | 1.2 | | 27 | |
| Example 3-5 | C ink | 30.1 | 28.1 | 2.0 | 1.9 | 23 | A (good) |
| | M ink | 27.6 | 26.6 | 1.0 | (1.0) | 22 | |
| | Y ink | 28.7 | 26.9 | 1.8 | | 22 | |
| | K ink | 30.8 | 27.9 | 2.9 | | 27 | |
| Example 3-6 | C ink | 28.7 | 28.5 | 0.2 | 0 | 28 | A+ (excellent) |
| | M ink | 28.9 | 28.7 | 0.2 | (0) | 28 | |
| | Y ink | 28.0 | 27.8 | 0.2 | | 27 | |
| | K ink | 29.1 | 28.9 | 0.2 | | 28 | |
| Example 3-7 | C ink | 29.9 | 28.0 | 1.9 | 0.7 | 27 | A (good) |
| | M ink | 29.0 | 27.8 | 1.2 | (0.7) | 27 | |
| | Y ink | 28.8 | 27.6 | 1.2 | | 27 | |
| | K ink | 32.1 | 30.6 | 1.5 | | 28 | |

TABLE 9

| | Kind of ink | Dynamic surface tension (mN/m) | | | | Static surface tension (mN/m) | Image peeling |
|---|---|---|---|---|---|---|---|
| | | 1 msec | 1 sec | Width of variations | Difference in width of variations | | |
| Comparative Example 3-1 | C ink | 33.7 | 28.5 | 5.2 | 4.2 | 28 | C (poor) |
| | M ink | 27.4 | 26.4 | 1.0 | (4.2) | 27 | |
| | Y ink | 27.8 | 26.8 | 1.0 | | 27 | |
| | K ink | 27.7 | 26.5 | 1.2 | | 22 | |
| Comparative Example 3-2 | C ink | 31.5 | 30.0 | 1.5 | 0.3 | 29 | C (poor) |
| | M ink | 31.0 | 29.8 | 1.2 | (0.3) | 29 | |
| | Y ink | 30.8 | 29.5 | 1.3 | | 29 | |
| | K ink | 30.6 | 29.2 | 1.4 | | 29 | |
| Comparative Example 3-3 | C ink | 29.3 | 28.1 | 1.2 | 2.2 | 27 | C (poor) |
| | M ink | 29.1 | 27.8 | 1.3 | (1.8) | 28 | |
| | Y ink | 31.2 | 28.2 | 3.0 | | 28 | |
| | K ink | 29.0 | 28.2 | 0.8 | | 27 | |

TABLE 9-continued

|  | Kind of ink | Dynamic surface tension (mN/m) | | Width of variations | Difference in width of variations | Static surface tension (mN/m) | Image peeling |
| --- | --- | --- | --- | --- | --- | --- | --- |
|  |  | 1 msec | 1 sec |  |  |  |  |
| Comparative Example 3-4 | C ink | 40.1 | 37.1 | 3 | 2.2 | 36 | C (poor) |
|  | M ink | 41.6 | 37.7 | 3.9 | (2.0) | 36 |  |
|  | Y ink | 38.6 | 36.7 | 1.9 |  | 35 |  |
|  | K ink | 38.2 | 36.5 | 1.7 |  | 36 |  |
| Comparative Example 3-5 | C ink | 30.1 | 28.1 | 2.0 | 1.6 | 23 | B (fair) |
|  | M ink | 27.1 | 25.6 | 1.5 | (1.1) | 21 |  |
|  | Y ink | 27.8 | 26.9 | 0.9 |  | 26 |  |
|  | K ink | 28.8 | 26.3 | 2.5 |  | 22 |  |

It can be seen from the results given above that the images formed from the inks of multiple colors of each of the ink sets of the Examples on the impermeable recording medium were more inhibited from peeling off than the images formed with the ink sets of the Comparative Examples.

Incidentally, the abbreviations and other details of the surfactants shown in Table 6 and Table 7 are as follows.

—Ethylene Oxide Adducts of Acetylene Glycol (Nissin Chemical Industry Co., Ltd.)—

Olfin E1010 (HLB=13-14)

Olfin EXP.4001 (HLB=8-11)

Olfin EXP.4123 (HLB=11-14)

Olfin EXP.4300 (HLB=10-13)

—Polyether-Modified Silicones (Nissin Chemical Industry Co., Ltd.)—

Silface SAG002 (HLB=12)

Silface SAG503A (HLB=11)

Example 4-1

(Cyan Ink; Expressed by "C Ink")

C.I. Pigment Blue 15:3 (colorant): 5% by mass

Styrene/acrylic acid copolymer neutralized with sodium: 2.5% by mass (water-soluble resin; weight-average molecular weight=30,000)

TOCRYL W-4627 (acrylic emulsion manufactured by Toyo Chem Co., Ltd.): 2.5% by mass (solid amount) (polymer particles; volume-average particle diameter=0.12 µm; glass transition temperature=45° C.)

Glycerin: 10% by mass

Surfactants (compounds shown in Table 10): the amounts in % by mass shown in Table 10

Ion-exchanged water: remainder

The ingredients shown above are mixed together, and the resultant mixture is filtered with a 5-µm filter to obtain a water-based ink (C ink).

(Magenta Ink; Expressed by "M Ink")

An M ink is obtained in the same manner as for the C ink, except that C.I. Pigment Red 122 is used as a colorant.

(Yellow Ink; Expressed by "Y Ink")

A Y ink is obtained in the same manner as for the C ink, except that C.I. Pigment Yellow 128 is used as a colorant.

(Black Ink; Expressed by "K Ink")

A K ink is obtained in the same manner as for the C ink, except that carbon black (Mogul L, manufactured by Cabot Corp.) is used as a colorant.

(Ink Set)

The C ink, M ink, Y ink, and K ink obtained are used as an ink set of Example 4-1.

Examples 4-2 to 4-4 and Comparative Examples 4-1 to 4-7

Ink sets were prepared in the same manner as in Example 4-1, except that the kinds of surfactants and the amounts thereof (% by mass) were changed in accordance with Table 10 and Table 11.

<Evaluation>

(Preparation of Recording Device)

A recording device having the same configuration as that shown in FIG. 1 and equipped with 600-dpi piezoelectric heads (amount of largest ink droplet, 11 pL) as ink ejection heads is prepared. Details of the recording device prepared are as follows.

—Details of Recording Device—

Recording speed (conveying speed of recording medium): 25 m/min

Set temperature of drying drum: 100° C.

Set temperature of hot-air blower: 100° C.

Impermeable recording medium: "OK Topcoat+", manufactured by Oji Paper Co., Ltd. (ream weight, 43 kg)

The inks of respective colors of the ink set of each Example or Comparative Example are packed into the ink tanks for respective colors of the recording device. This recording device is used to conduct the following image recording.

(Image Recording)

Using each recording device, the inks were ejected from the 600-dpi piezoelectric heads (amount of largest ink droplet, 11 pL) onto "OK Topcoat+", manufactured by Oji Paper Co., Ltd., as an impermeable recording medium to record thereon solid images of 1.5 cm×1.5 cm (solid images of three colors formed from the C ink, M ink, and Y ink and solid images of four colors formed from the inks of the four colors). Thereafter, this recording medium was subjected to drying with the drying drum and the hot-air blower and to cooling with the cooling rollers. Through these steps, images formed from the inks were recorded on the impermeable recording medium.

The images recorded were visually examined and evaluated for image graininess and for image peeling due to drying failure. The criteria for the evaluation are as follows.

—Criteria for Image Graininess Evaluation—

A+ (excellent): no graininess is observed in the images

A (good): graininess is observed only in the limited part of the images

B (fair): the images partly have white spots, and graininess is observed

C (poor): considerable graininess is observed in the images

—Criteria for Image Peeling Evaluation—

A+ (excellent): no peeling is observed in the four-color portions of the images

A (good): no peeling is observed in the three-color portions of the images

B (fair): part of the images have peeled off

C (poor): the images have suffered considerable peeling and caused fouling

Details of the Examples and Comparative Examples and of the results of the evaluation are shown in Table 10 to Table 13 below.

In the column "Difference in width of variations" under "Dynamic surface tension", each upper numeral indicates a maximum value of the difference in the width of variations in dynamic surface tension between the inks of four colors, i.e., the C ink, M ink, Y ink, and K ink. Meanwhile, each lower numeral in the parenthesis indicates a maximum value of the difference in the width of variations in dynamic surface tension between the inks of three colors, i.e., the C ink, M ink, and Y ink.

Furthermore, "Contact angle" indicates the contact angle of each ink with "OK Topcoat+", manufactured by Oji Paper Co., Ltd., as an impermeable recording medium.

TABLE 10

| | | Surfactants (% by mass) | | | | | |
| | | Ethylene oxide adduct of acetylene glycol | | | | Polyether-modified silicone | |
| | Kind of ink | Olfin E1010 | Olfin EXP4001 | Olfin EXP4123 | Olfin EXP4300 | Silface SAG002 | Silface SAG503A |
|---|---|---|---|---|---|---|---|
| Example 4-1 | C ink | 2 | | | 0.8 | | |
| | M ink | 2 | | | 0.8 | | |
| | Y ink | 2 | | | 0.8 | | |
| | K ink | 2 | | | 0.8 | | |
| Example 4-2 | C ink | 2 | | 1.8 | | | |
| | M ink | 2 | | 1.8 | | | |
| | Y ink | 2 | | 1.8 | | | |
| | K ink | 2 | | 1.8 | | | |
| Example 4-3 | C ink | 2 | | | 1 | | |
| | M ink | 2 | 1 | | | | |
| | Y ink | 2 | 1 | | | | |
| | K ink | 2 | 0.5 | | | | |
| Example 4-4 | C ink | 2 | | 3 | | | |
| | M ink | 2 | | 3 | | | |
| | Y ink | 2 | | 3 | | | |
| | K ink | 2 | | | | | 0.3 |
| Comparative Example 4-1 | C ink | 1 | | | 0.5 | | |
| | M ink | 1 | | | 0.5 | | |
| | Y ink | 1 | | | 0.5 | | |
| | K ink | 1 | | | 0.5 | | |
| Comparative Example 4-2 | C ink | 3 | | | 2 | | |
| | M ink | 3 | | | 2 | | |
| | Y ink | 3 | | | 2 | | |
| | K ink | 3 | | | 2 | | |

TABLE 11

| | | Surfactants (% by mass) | | | | | |
| | | Ethylene oxide adduct of acetylene glycol | | | | Polyether-modified silicone | |
| | Kind of ink | Olfin E1010 | Olfin EXP4001 | Olfin EXP4123 | Olfin EXP4300 | Silface SAG002 | Silface SAG503A |
|---|---|---|---|---|---|---|---|
| Comparative Example 4-3 | C ink | 2 | | | | | 0.2 |
| | M ink | 2 | | 2 | | | |
| | Y ink | 2 | | 2 | | | |
| | K ink | 2 | | | | 0.1 | |
| Comparative Example 4-4 | C ink | 2 | | | | 0.4 | |
| | M ink | 2 | | | | 0.4 | |
| | Y ink | 2 | | | | 0.4 | |
| | K ink | 2 | | | | 0.4 | |
| Comparative Example 4-5 | C ink | 2 | | 1.5 | | | |
| | M ink | 2 | | 2 | | | |
| | Y ink | 2 | | 2 | | | |
| | K ink | 2 | | 2 | | | |
| Comparative Example 4-6 | C ink | 3 | | | | 0.3 | |
| | M ink | 3 | | | | 0.3 | |
| | Y ink | 3 | | | | 0.3 | |
| | K ink | 2 | | | | 0.4 | |

TABLE 11-continued

| | | Surfactants (% by mass) | | | | | |
|---|---|---|---|---|---|---|---|
| | | Ethylene oxide adduct of acetylene glycol | | | | Polyether-modified silicone | |
| | Kind of ink | Olfin E1010 | Olfin EXP4001 | Olfin EXP4123 | Olfin EXP4300 | Silface SAG002 | Silface SAG503A |
| Comparative Example 4-7 | C ink | | 0.05 | | | | 0.08 |
| | M ink | | 0.05 | | | | 0.05 |
| | Y ink | | 0.05 | | | | 0.02 |
| | K ink | | 0.05 | | | | |

TABLE 12

| | Kind of ink | Dynamic surface tension (mN/m) | | Width of variations | Difference in width of variations | Static surface tension (mN/m) | Contact angle (°) | Image graininess | Image peeling |
|---|---|---|---|---|---|---|---|---|---|
| | | 1 msec | 1 sec | | | | | | |
| Example 4-1 | C ink | 28.1 | 26.8 | 1.3 | 0.4 | 26 | 15 | A (good) | A+ (excellent) |
| | M ink | 29.1 | 27.8 | 1.3 | (0.1) | 27 | 15 | | |
| | Y ink | 29.7 | 28.3 | 1.4 | | 28 | 16 | | |
| | K ink | 28.0 | 26.3 | 1.7 | | 26 | 17 | | |
| Example 4-2 | C ink | 28.8 | 26.8 | 2.0 | 0.9 | 22 | 12 | A (good) | A+ (excellent) |
| | M ink | 27.8 | 26.3 | 1.5 | (0.9) | 22 | 14 | | |
| | Y ink | 27.0 | 25.9 | .1 | | 22 | 11 | | |
| | K ink | 28.1 | 26.9 | .2 | | 26 | 16 | | |
| Example 4-3 | C ink | 29.9 | 28.0 | .9 | 0.7 | 27 | 12 | A+ (excellent) | A (good) |
| | M ink | 29.0 | 27.8 | .2 | (0.7) | 27 | 13 | | |
| | Y ink | 28.8 | 27.6 | .2 | | 28 | 12 | | |
| | K ink | 32.1 | 30.6 | .5 | | 28 | 14 | | |
| Example 4-4 | C ink | 28.7 | 28.5 | 0.2 | 1.0 | 28 | 10 | A+ (excellent) | A+ (excellent) |
| | M ink | 28.9 | 28.7 | 0.2 | (0) | 28 | 11 | | |
| | Y ink | 28.0 | 27.8 | 0.2 | | 27 | 10 | | |
| | K ink | 27.7 | 26.5 | 1.2 | | 22 | 11 | | |
| Comparative Example 4-1 | C ink | 33.9 | 30.5 | 3.4 | 2.5 | 27 | 14 | A (good) | B (fair) |
| | M ink | 27.5 | 26.6 | 0.9 | (2.5) | 27 | 15 | | |
| | Y ink | 28.0 | 27.1 | 0.9 | | 27 | 14 | | |
| | K ink | 28.5 | 27.3 | 1.2 | | 27 | 16 | | |
| Comparative Example 4-2 | C ink | 29.9 | 28.3 | 1.6 | 1.4 | 25 | 18 | A (good) | B (fair) |
| | M ink | 28.8 | 27.7 | 1.1 | (1.4) | 27 | 16 | | |
| | Y ink | 28.0 | 27.8 | 0.2 | | 27 | 17 | | |
| | K ink | 28.5 | 27.3 | 1.2 | | 27 | 14 | | |

TABLE 13

| | Kind of ink | Dynamic surface tension (mN/m) | | Width of variations | Difference in width of variations | Static surface tension (mN/m) | Contact angle (°) | Image graininess | Image peeling |
|---|---|---|---|---|---|---|---|---|---|
| | | 1 msec | 1 sec | | | | | | |
| Comparative Example 4-3 | C ink | 33.7 | 28.5 | 5.2 | 4.2 | 28 | 10 | A (good) | C (poor) |
| | M ink | 27.4 | 26.4 | 1.0 | (4.2) | 27 | 11 | | |
| | Y ink | 27.8 | 26.8 | 1.0 | | 27 | 10 | | |
| | K ink | 27.7 | 26.5 | 1.2 | | 22 | 17 | | |
| Comparative Example 4-4 | C ink | 27.8 | 26.6 | 1.2 | 0.7 | 21 | 23 | B (fair) | A+ (excellent) |
| | M ink | 27.1 | 25.7 | 1.4 | (0.2) | 21 | 24 | | |
| | Y ink | 27.4 | 26.1 | 1.3 | | 21 | 23 | | |
| | K ink | 28.4 | 26.5 | 1.9 | | 21 | 19 | | |
| Comparative Example 4-5 | C ink | 29.1 | 27.1 | 2.0 | 0.8 | 22 | 22 | B (fair) | A+ (excellent) |
| | M ink | 27.2 | 26.0 | 1.2 | (0.8) | 22 | 22 | | |
| | Y ink | 26.8 | 25.6 | 1.2 | | 22 | 23 | | |
| | K ink | 27.7 | 26.5 | 1.2 | | 22 | 17 | | |
| Comparative Example 4-6 | C ink | 27.5 | 26.3 | 1.2 | 1.0 | 21 | 25 | C (poor) | A+ (excellent) |
| | M ink | 27.5 | 25.3 | 2.2 | (1.0) | 21 | 26 | | |
| | Y ink | 27.7 | 26.3 | 1.4 | | 21 | 25 | | |
| | K ink | 28.4 | 26.5 | 1.9 | | 21 | 19 | | |

TABLE 13-continued

| Kind of ink | Dynamic surface tension (mN/m) | | Width of variations | Difference in width of variations | Static surface tension (mN/m) | Contact angle (°) | Image graininess | Image peeling |
|---|---|---|---|---|---|---|---|---|
| | 1 msec | 1 sec | | | | | | |
| Comparative Example 4-7 C ink | 40.1 | 37.1 | 3.0 | 2.2 (2.0) | 36 | 25 | C (poor) | C (poor) |
| M ink | 41.6 | 37.7 | 3.9 | | 36 | 22 | | |
| Y ink | 38.6 | 36.7 | 1.9 | | 35 | 26 | | |
| K ink | 38.2 | 36.5 | 1.7 | | 36 | 23 | | |

It can be seen from the results given above that the images formed from the inks of multiple colors of each of the ink sets of the Examples on the impermeable recording medium were more inhibited from peeling off and from having graininess than the images formed with the ink sets of the Comparative Examples.

Incidentally, the abbreviations and other details of the surfactants shown in Table 10 and Table 11 are as follows.
—Ethylene oxide adducts of acetylene glycol (Nissin Chemical Industry Co., Ltd.)—
 Olfin E1010 (HLB=13-14)
 Olfin EXP.4001 (HLB=8-11)
 Olfin EXP.4123 (HLB=11-14)
 Olfin EXP.4300 (HLB=10-13)
—Polyether-Modified Silicones (Nissin Chemical Industry Co., Ltd.)—
 Silface SAG002 (HLB=12)
 Silface SAG503A (HLB=11)

What is claimed is:

1. An inkjet ink comprising a colorant, a polymer particle, water, and a water-soluble organic solvent,
wherein the ink has a static surface tension of less than 30 mN/m and, when examined for dynamic surface tension by the maximum bubble pressure method, has a width of variations in dynamic surface tension in a period of 1 msec to 1 sec, the width being 0.2 mN/m to 3.0 mN/m, and
wherein the inkjet ink has a dynamic surface tension measured as 32 mN/m or less after 1 msec and a dynamic surface tension measured at less than 30 mN/m after 1 sec.

2. The inkjet ink according to claim 1, which is a black ink.

3. The inkjet ink according to claim 1,
wherein the content of the polymer particle is 2% by mass to 10% by mass based on the ink, and the width of variations is 0.2 mN/m to 2.0 mN/m.

4. An inkjet recording device equipped with one or more ejection heads which eject one or more inks including the ink according to claim 1 onto a recording medium.

5. The inkjet recording device according to claim 4, which is further equipped with a dryer that dries the ink(s) ejected onto the recording medium.

6. The inkjet recording device according to claim 5,
wherein the drying with the dryer is conducted at a temperature of 35° C. to 200° C. in terms of the surface temperature of the recording medium.

7. The inkjet recording device according to claim 4,
wherein
the ink contains a colorant, a polymer particle, water, and a water-soluble organic solvent, the content of the polymer particle being 2% by mass to 10% by mass based on the ink,
the ink having a static surface tension of 30 mN/m or less and, when examined for dynamic surface tension by the maximum bubble pressure method, having a width of variations in dynamic surface tension, in a period of 1 msec to 1 sec, the width being 0.2 mN/m to 2.0 mN/m, and the recording medium is press-bonding paper for ink-jet recording and
the ejection heads eject the inks onto the pressure-sensitive adhesive layer of the press-bonding paper for ink-jet recording.

8. The inkjet recording device according to claim 7, which is further equipped with a dryer that dries the inks ejected onto the pressure-sensitive adhesive layer.

9. The inkjet recording device according to claim 4,
wherein
the inks are water-based inks of multiple colors different from each other, the water-based inks each comprising a colorant, a polymer particle, water, and a water-soluble organic solvent, having a static surface tension of 28 mN/m or less, and when examined for dynamic surface tension by the maximum bubble pressure method, having a width of variations in dynamic surface tension, in a period of 1 msec to 1 sec, the width being 0.2-2.0 mN/m,
and the recording medium is an impermeable recording medium.

10. The inkjet recording device according to claim 9, which is further equipped with a dryer that dries the water-based inks ejected onto the impermeable recording medium.

11. The inkjet recording device according to claim 4,
wherein
the recording medium is an impermeable recording medium,
the inks are water-based inks of multiple colors different from each other, the water-based inks each containing a colorant, a polymer particle, water, and a water-soluble organic solvent, having a static surface tension of 28 mN/m or less, having a width of variations in dynamic surface tension, in a period of 1 msec to 1 sec, the width being 0.2 mN/m to 2.0 mN/m when examined for dynamic surface tension by the maximum bubble pressure method, and forming a contact angle of 10° to 20° with the impermeable recording medium.

12. The inkjet recording device according to claim 11, which is further equipped with a dryer that dries the water-based inks ejected onto the impermeable recording medium.

13. An inkjet recording device equipped with one or more ejection heads which eject one or more inks including an inkjet ink onto a recording medium, the inkjet ink comprising:
a colorant, a polymer particle, water, and a water-soluble organic solvent,
wherein:
the ink has a static surface tension of less than 30 mN/m and, when examined for dynamic surface tension by the maximum bubble pressure method, has a width of variations in dynamic surface tension in a period of 1 msec to 1 sec, the width being 0.2 mN/m to 3.0 mN/m, the recording medium is an impermeable recording medium, and the inks are water-based inks of multiple colors different from each other, the water-based inks each containing a colorant, a polymer particle, water, and a water-soluble organic solvent, having a static surface tension of 28 mN/m or less, having a width of variations in dynamic surface tension, in a period of 1 msec after to 1 sec, the width being 0.2 mN/m to 2.0 mN/m when examined for dynamic surface tension by the maximum bubble pressure method, and forming a contact angle of 10° to 20° with the impermeable recording medium.

* * * * *